(12) United States Patent
Jagusztyn

(10) Patent No.: US 9,151,541 B2
(45) Date of Patent: Oct. 6, 2015

(54) HEAT TRANSFER SYSTEM

(75) Inventor: Tadeusz Frank Jagusztyn, Fort Lauderdale, FL (US)

(73) Assignee: Grundfos Holding A/S, Bjerringbro (DK)

( * ) Notice: Subject to any disclaimer, the term of this patent is extended or adjusted under 35 U.S.C. 154(b) by 775 days.

(21) Appl. No.: 13/326,029

(22) Filed: Dec. 14, 2011

(65) Prior Publication Data

US 2012/0151950 A1    Jun. 21, 2012

Related U.S. Application Data

(60) Provisional application No. 61/423,577, filed on Dec. 15, 2010.

(51) Int. Cl.
| | |
|---|---|
| *F25B 39/04* | (2006.01) |
| *F28D 7/16* | (2006.01) |
| *F28F 1/00* | (2006.01) |
| *F28F 1/02* | (2006.01) |
| *F24D 17/00* | (2006.01) |
| *F24D 17/02* | (2006.01) |
| *F28F 9/02* | (2006.01) |
| *F28F 19/00* | (2006.01) |
| *F28F 19/02* | (2006.01) |

(52) U.S. Cl.
CPC .......... *F28D 7/1684* (2013.01); *F24D 17/0005* (2013.01); *F24D 17/02* (2013.01); *F28F 1/003* (2013.01); *F28F 1/022* (2013.01); *F24D 2200/20* (2013.01); *F24D 2200/31* (2013.01); *F28F 9/0219* (2013.01); *F28F 19/006* (2013.01); *F28F 19/02* (2013.01); *F28F 2260/02* (2013.01)

(58) Field of Classification Search
CPC ... F28D 7/1684; F28D 17/0005; F28D 17/02; F28F 1/022; F28F 1/003; F28F 9/0219; F28F 2260/02; F28F 1/22; F24D 2200/20
USPC .............. 62/506, 238.6, 228.1; 165/100, 110, 165/139, 140, 164, 170, 133, 180
See application file for complete search history.

(56) References Cited

U.S. PATENT DOCUMENTS

| 5,004,046 A | 4/1991 | Jones | |
|---|---|---|---|
| 5,898,995 A * | 5/1999 | Ghodbane | ................. 29/890.03 |

(Continued)

FOREIGN PATENT DOCUMENTS

| JP | 10-103795 A | 4/1998 | |
|---|---|---|---|
| JP | 2002-107091 A | 4/2002 | |
| WO | WO 9425815 A1 * | 11/1994 | ............... F28F 1/02 |

OTHER PUBLICATIONS

Ashrae Position Document of Natural Refrigerants, 2009, 10 pgs.

*Primary Examiner* — Emmanuel Duke
(74) *Attorney, Agent, or Firm* — Dean D. Small; The Small Patent Law Group, LLC

(57) ABSTRACT

A heat transfer system includes a heat exchanger configured to transfer heat between a first fluid and a second fluid. The heat exchanger includes an outer sleeve and a microchannel unit. The outer sleeve has an interior surface defining a cavity and an exterior surface configured to be in direct thermal communication with the first fluid. The microchannel unit is received in the cavity. The microchannel unit has a plurality of microchannels configured to receive the second fluid therein and be in direct thermal communication with the second fluid. The microchannel unit has an exterior surface in direct thermal communication with the interior surface of the outer sleeve to transfer heat therebetween. At least one of the interior surface of the outer sleeve and the exterior surface of the microchannel unit has grooves defining breach channels for the first fluid or the second fluid should a breach in the outer sleeve or the microchannel unit occur.

40 Claims, 7 Drawing Sheets

(56) References Cited

U.S. PATENT DOCUMENTS

| | | |
|---|---|---|
| 5,967,228 A | 10/1999 | Bergman et al. |
| 6,775,996 B2 | 8/2004 | Cowans |
| 7,658,082 B2 | 2/2010 | Jagusztyn |
| 7,732,059 B2 | 6/2010 | Ren et al. |
| 2006/0102321 A1* | 5/2006 | Shincho et al. .................. 165/81 |
| 2007/0243127 A1* | 10/2007 | Fedorov et al. ............. 423/648.1 |
| 2008/0000262 A1* | 1/2008 | Kufis ................................ 62/513 |
| 2008/0184724 A1* | 8/2008 | Jagusztyn .................... 62/238.6 |
| 2009/0025916 A1* | 1/2009 | Meshenky et al. ............. 165/151 |
| 2009/0084532 A1* | 4/2009 | Agee ............................ 165/170 |
| 2010/0025024 A1* | 2/2010 | Meshenky et al. ............. 165/164 |

* cited by examiner

HEAT TRANSFER SYSTEM

CROSS REFERENCE TO RELATED APPLICATIONS

This application claims the benefit of U.S. Provisional Application No. 61/423,577 filed Dec. 15, 2010, the subject matter of which is herein incorporated by reference in its entirety.

BACKGROUND OF THE INVENTION

The subject matter herein relates generally to the field of energy conservation, and, more particularly, to the field and related methods of heat transfer systems for warming water.

Buildings, such as hospitals, for example, may need to provide large quantities of hot water on demand to patients or processes. This can be a problem during peak usage hours, e.g., mornings when patients are generally taking warm showers or evenings when onsite laundries need hot water. Many hospitals use hot water storage tanks to store hot water so that patients and laundries may use hot water on demand without compromising the temperature. Water stored in hot water storage tanks are generally heated using fuel based heaters. Hot water temperature in storage tanks is recommended to be maintained at a temperature of 140° F. or higher in order to provide water at a desired temperature for use and/or to prevent the colonization of *Legionella* bacteria.

Energy costs may be high to maintain the hot water temperature. Another dilemma facing building engineers is the scalding of humans with the high temperature 140° F. storage tank water. One solution is anti scaling devices which deliver 120° F. temperature or less to the space. It is inefficient to heat water in storage tanks to 140° F. to prevent *Legionella* only to dilute to 120° F. at the point of service. Some building applications such as hospitals have eliminated the large storage tanks and use instantaneous heating of water to the delivery temperature of 120° F. using steam from large fuel burning boilers. With or without storage, emissions from the fossil fuel boilers or water heaters are known to cause increased pollution and global warming. Moreover, as fossil fuel becomes scarcer, the price of heating hot water will undoubtedly escalate.

Heat pump water heaters have been applied on a limited basis to heat water systems generally using an air source. These heat pump systems traditionally use synthetic refrigerants, such as R134a, which has a global warming potential approximately 1300 times greater than $CO_2$. Therefore synthetic refrigerants such as R134a are known as "Greenhouse Gases" with a GWP of 1300 (Global Warming Potential). Even the latest synthetic refrigerants to replace R134a, such as proprietary refrigerant HFO1234yf (DuPont & Honeywell), reportedly has a GWP of 600 times that of $CO_2$.

The aforementioned heat pump water heating systems are generally applied for space heating systems where the hot water is in a closed system. When potable water is needed to be applied to a heat pump, the choice is to apply an isolation water loop between the two systems to avoid cross contamination of the refrigerant and oil to the potable water. This custom engineered isolation loop is both costly and inefficient. Another solution for a heat pump water heater is to apply commercially available double wall vented brazed plate heat exchangers (BPHE). This approach has some disadvantages in that the heat exchangers are not cleanable or serviceable. Moreover the vented chamber between the two requires a great deal of costly heat transfer surface. Moreover these heat exchangers are vastly inefficient compared to single wall heat exchangers. Often the conventional heat pump water heating systems have vapor compression systems that are not dynamic enough to satisfy the demands of an instantaneous heating to 120° F. and therefore are applied with storage tanks maintaining approximately 140° F.

A natural refrigerant such as ammonia $NH_3$ is more efficient than most synthetic refrigerants and has zero, global warming potential and zero ozone depletion potential as understood by those skilled in the art. However, ammonia cannot be applied to commercially available double wall BPHE's because there is copper in the system which is attacked by the refrigerant. Hydrocarbon refrigerants such as propane or isobutane have superior thermal characteristics to most synthetic refrigerants, leading to higher efficiencies and have excellent environmental performance with a GWP of 3. These refrigerants however are flammable in concentrations between approximately 2% to 9% of concentration and fail safe containment heat exchanger systems are not commercially available.

Another problem associated with known heat transfer systems, is that commercially available water to refrigerant evaporators are susceptible to freezing, particularly when the recovery temperature is below 48° F. or the system is operating in a low flow situation. The normal failure mode is ice forming on the water side of the refrigerant evaporators and the fragile wall breaches to the refrigerant side often destroying the compressor. In order to avoid this situation, prior art heat pump water heaters have thermostats to turn off the system if temperatures approach a predetermined low temperature. This however shuts off the production of hot water and compromises reliability. Chilled water heat recovery, as introduced by the prior art, is beneficial because heating and cooling are accomplished with the same kilowatt. However, the prior art fails to address building systems in cooler climates without an air conditioning load or even buildings in warm climates that do not have the availability to recover from a chilled water or condenser water system. Chillers with heat reclaim systems are focused on controlling leaving chilled water temperature while the recovered leaving hot water temperature is uncontrolled often falling below a set point during cool outside temperatures or low cooling load necessitating supplemental heating devices, such as fueled or electric resistance hot water heaters.

A need remains for a heat transfer system that overcomes these and other problems.

BRIEF DESCRIPTION OF THE INVENTION

In one embodiment, a heat transfer system is provided that includes a water line for carrying water and a refrigerant line for carrying a refrigerant. A refrigerant desuperheater heat exchanger is in fluid communication with the refrigerant line and the water line and refrigerant enters the refrigerant desuperheater as a superheated gas and is cooled to a hot gas. A refrigerant condenser heat exchanger is in fluid communication with the water line and the refrigerant line and the refrigerant enters the refrigerant condenser as a hot gas and is cooled to a warmed liquid. A refrigerant sub-cooler heat exchanger is in fluid communication with the water line and the refrigerant line and the refrigerant enters the refrigerant sub-cooler as a warmed liquid and is cooled to a cooled liquid. The water enters the refrigerant sub-cooler heat exchanger and is warmed, enters the refrigerant condenser heat exchanger and is warmed, and enters the refrigerant desuperheater heat exchanger and is warmed. The refrigerant desuperheater heat exchanger, refrigerant condenser heat exchanger, and refrigerant sub-cooler heat exchanger are sleeved microchannel heat exchangers each having a microchannel unit received in an outer sleeve and in thermal communication therewith. The refrigerant passes through the microchannel unit and is in thermal communication therewith and the water passes along the sleeve and is in thermal communication therewith.

Optionally, each of the refrigerant desuperheater heat exchanger, refrigerant condenser heat exchanger and refrigerant sub-cooler heat exchanger may include a refrigerant inlet and a refrigerant outlet. Each of the refrigerant desuperheater heat exchanger, the refrigerant condenser heat exchanger, and the refrigerant sub-cooler heat exchanger may include a water inlet and a water outlet.

Optionally, the heat transfer system may include a water pump in fluid communication with the water line that pumps water through at least one of the refrigerant desuperheater heat exchanger, the refrigerant condenser heat exchanger and the refrigerant sub-cooler heat exchanger. The heat transfer system may include a vapor compressor device in fluid communication with the refrigerant line, wherein the refrigerant enters the vapor compressor device as a cool gas and is heated to a superheated gas. The heat transfer system may include a controller in communication with the water pump and the vapor compressor device to control the water pump and vapor compressor device responsive to demand. The heat transfer system may include a temperature sensor measuring the temperature of the water line. The controller may be in communication with the temperature sensor to control the water pump and vapor compressor device responsive to demand. The heat transfer system may include a housing carrying the refrigerant desuperheater heat exchanger, the refrigerant condenser heat exchanger, and the refrigerant sub-cooler heat exchanger.

Optionally, the heat transfer system may include a heat source line having a heat source fluid therein and a refrigerant evaporator heat exchanger in fluid communication with the heat source line and the refrigerant line. The refrigerant evaporator heat exchanger may be configured to extract heat from the heat source fluid in the heat source line and may be configured to warm the refrigerant in the refrigerant line. The refrigerant evaporator heat exchanger may be a sleeved microchannel heat exchanger having a microchannel unit received in an outer sleeve and in thermal communication therewith. The refrigerant may pass through the microchannel unit and be in thermal communication therewith and the heat source fluid in the heat source line may pass along the outer sleeve and be in thermal communication therewith.

In another embodiment, a heat transfer system is provided having a refrigerant evaporator heat exchanger configured to be in fluid communication with a heat source line and a refrigerant line. The refrigerant evaporator heat exchanger is configured to extract heat from fluid in the heat source line and warm the refrigerant in the refrigerant line. The heat transfer system includes a refrigerant desuperheater heat exchanger configured to be in fluid communication with the refrigerant line and a water line, wherein the refrigerant desuperheater heat exchanger is configured to extract heat from the refrigerant in the refrigerant line and warm fluid in the water line. The heat transfer system includes a refrigerant condenser heat exchanger configured to be in fluid communication with the refrigerant line and a water line, wherein the refrigerant condenser heat exchanger is configured to extract heat from the refrigerant in the refrigerant line and warm fluid in the water line. The heat transfer system includes a refrigerant sub-cooler heat exchanger configured to be in fluid communication with the refrigerant line and a water line, wherein the refrigerant sub-cooler heat exchanger is configured to extract heat from the refrigerant in the refrigerant line and warm fluid in the water line. The refrigerant evaporator heat exchanger, the refrigerant desuperheater heat exchanger, the refrigerant condenser heat exchanger, and the refrigerant sub-cooler heat exchanger are sleeved microchannel heat exchangers each having a microchannel unit received in an outer sleeve and in thermal communication therewith. The refrigerant passes through the microchannel unit and is in thermal communication therewith. The water or fluid in the heat source line passes along the sleeve and is in thermal communication therewith.

In a further embodiment, a heat transfer system is provided having a refrigerant condenser heat exchanger configured to be in fluid communication with a water line and a refrigerant line. The refrigerant condenser heat exchanger is configured to extract heat from refrigerant in the refrigerant line and warm fluid in the water line. The heat transfer system includes a refrigerant evaporator heat exchanger configured to be in fluid communication with a heat source line and the refrigerant line. The refrigerant evaporator heat exchanger is configured to extract heat from fluid in the heat source line and warm the refrigerant in the refrigerant line. The refrigerant condenser heat exchanger and the refrigerant evaporator heat exchanger are sleeved microchannel heat exchangers each having a microchannel unit received in an outer sleeve and in thermal communication therewith. The refrigerant passes through the microchannel unit and is in thermal communication therewith and the fluid from the water line or the heat source line passes along the sleeve and is in thermal communication therewith.

In another embodiment, a heat transfer system is provided having a heat exchanger configured to transfer heat between a first fluid and a second fluid. The heat exchanger includes an outer sleeve and a microchannel unit. The outer sleeve has an interior surface defining a cavity and an exterior surface configured to be in direct thermal communication with the first fluid. The microchannel unit is received in the cavity. The microchannel unit has a plurality of microchannels configured to receive the second fluid therein and be in direct thermal communication with the second fluid. The microchannel unit has an exterior surface in direct thermal communication with the interior surface of the outer sleeve to transfer heat therebetween. At least one of the interior surface of the outer sleeve and the exterior surface of the microchannel unit has grooves defining breach channels for the first fluid or the second fluid should a breach in the outer sleeve or the microchannel unit occur.

Optionally, the exterior surface of the outer sleeve may have enhancements to increase a surface area of the exterior surface for greater thermal transfer between the outer sleeve and the first fluid. The exterior surface may have interstices extending into a flow path of the first fluid. The microchannels may have enhancements to increase the surface area of the microchannels for greater thermal transfer between the microchannel unit and the second fluid. The microchannels may have interstices extending into a flow path of the second fluid. Optionally, the first fluid may be potable water and the second fluid may be a refrigerant. The microchannel unit and the outer sleeve may extend longitudinally between ends with the grooves extending between corresponding ends and being in fluid communication with a breach manifold at least one of the ends.

Optionally, the outer sleeve and microchannel unit may define a heat transfer device. The heat exchanger may include a housing holding a plurality of the heat transfer devices. The housing may have an inlet and outlet for the first fluid and may have an inlet and outlet for the second fluid. The housing may have a breach chamber in fluid communication with the breach channels of a plurality of the heat transfer devices. The breach chamber may collect the first fluid or the second fluid should a breach in the outer sleeve or the microchannel unit occur. The housing may include a cap and a receptacle coupled to the cap. The heat transfer devices may be supported by the cap and may be received in the receptacle. The receptacle may be removable from the cap and from the heat transfer devices to expose the heat transfer devices. The housing may include baffles between the heat transfer devices.

DETAILED DESCRIPTION OF THE INVENTION

Figure 1:
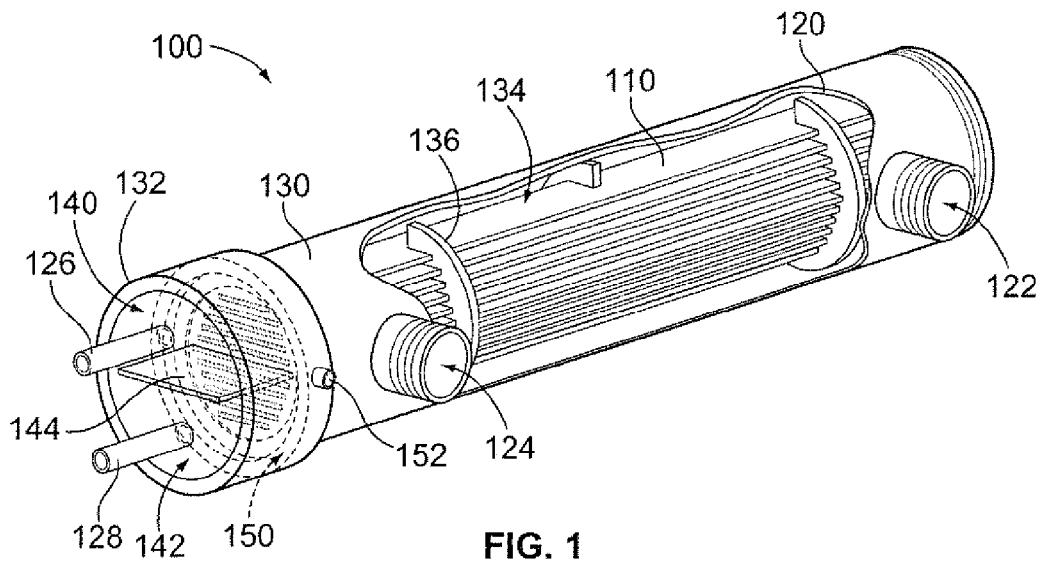
FIG. 1 illustrates a heat exchanger formed in accordance with an exemplary embodiment.

FIG. 1 illustrates a heat exchanger 100 formed in accordance with an exemplary embodiment. The heat exchanger may be used as part of a heat transfer system 102 (shown in FIG. 6), such as a vapor compression system. Those skilled in the art of vapor compression systems know that the refrigerant in the heat transfer system 102 goes through four phases. The desuperheater is single phase gas heat transfer. The condenser is a bi-phase heat transfer from a gas to a liquid. The sub-cooler is a single phase liquid heat transfer. Finally the evaporator is a bi-phase going from a liquid to a gas heat transfer. In an exemplary embodiment, heat exchangers, such as the heat exchanger 100, are used at each of the phases. The heat exchangers 100 may be altered to take advantage of the particular phase of the refrigerant, but generally include similar features.

The heat exchanger 100 includes a plurality of heat transfer devices 110 held within a housing 120. In an exemplary embodiment, the heat transfer devices 110 are sleeved microchannel heat exchangers (SMHX). Other types of heat exchangers may be used in alternative embodiments, such as double wall vented brazed plate heat exchangers, single walled heat exchangers, and the like. In an exemplary embodiment, the heat transfer devices 110 include outer sleeves 114 (shown in FIG. 2) and microchannel units 116 (shown in FIG. 3) received in the outer sleeves 114. The heat transfer devices 110 allow for direct thermal engagement between the outer sleeves 114 and the microchannel units 116, while also providing breach channels for dissipating breach fluid from the heat transfer devices 110 should a breech in the outer sleeve 114 of the microchannel units 116 occur. Risk of cross-contamination of a fluid inside the microchannel units 116 (e.g. refrigerant, oil and the like) with a fluid outside of the outer sleeve 114 (e.g. potable water) is reduced or minimized.

The heat exchanger 100 includes the housing 120 holding the heat transfer devices 110. The housing 120 defines a flow path therethrough for a first fluid, such as water, to which or from which heat is transferred by the heat transfer devices 110 from or to a second fluid, such as refrigerant, in the microchannel units 116. The heat exchanger 100 includes a first fluid inlet 122, a first fluid outlet 124, a second fluid inlet 126 and a second fluid outlet 128. The inlets and outlets may be ports in the housing 120, fittings extending from the housing 120, quick-connect connections extending from the housing 120, pipes extending from the housing 120, and the like. Any number of inlets and outlets may be provided depending on the particular application.

In the illustrated embodiment, the housing 120 includes a receptacle 130 and a cap 132. The receptacle 130 and cap 132 may be made of a polymer, such as polypropylene random pipe (PPR), or any other type of pipe having similar properties that resists corrosion, as understood by those skilled in the art. Other materials having other beneficial characteristics, such as thermal characteristics, may be used in alternative embodiments. The receptacle 130 and/or the cap 132 may be manufactured from aluminum. Optionally, the receptacle 130 and cap 132 may be manufactured from the same material. The receptacle 130 defines a flow path for the first fluid. The inlet 122 and outlet 124 are in fluid communication with a cavity 134 of the receptacle 130. The heat transfer devices 110 are positioned in the cavity 134 in the flow path through the receptacle 130. The receptacle 130 surrounds the heat transfer devices 110. The receptacle 130 may have any shape, including a cylindrical or barrel shape as shown in FIG. 1, or another shape such as a box shape or any other suitable shape. Having the receptacle 130 barrel shaped allows the receptacle 130 to be threadably coupled to the cap 132 and removed by rotating the barrel. The receptacle 130 may be coupled to the cap 132 by other connection methods or features, such as quick-connect type of connection, using fasteners, latches or other means. Removal allows the heat transfer devices 110 to be exposed and the heat transfer devices 110 and/or the receptacle 130 to be cleaned. Optionally, the heat transfer devices 110 may remain secured to and supported by the cap 132 when the receptacle 130 is removed, thus exposing the heat transfer devices 110. Alternatively, the heat transfer devices 110 may be removed from the cap 132 with the receptacle 130 and later removed from the receptacle 130 for cleaning, repair or replacement.

Optionally, baffles 136 may be positioned in the flow path defined by the receptacle 130. The baffles 136 are spaced advantageously within the receptacle 130 to form a turbulent fluid path therethrough, which may help to promote heat transfer between the first fluid and the heat transfer devices 110.

Optionally, interstice enhancements could be added between the heat transfer devices 110 to increase the thermal transfer between the first fluid and the heat transfer devices 110. For example, fins, spikes, protrusions, posts, mesh, screens and the like, which are in thermal communication with the outer sleeves 114, may be placed in the flow path to ensure beneficial heat transfer occurs between the first fluid and the heat transfer devices 110. The positioning and number of enhancements should be balanced with the effects of pressure drop incurred by having such enhancements in the flow path.

The cap 132 defines a flow path for the second fluid. The shape of the cap 132 may be complementary to the shape of the receptacle 130. The inlet 126 and outlet 128 are in fluid communication with corresponding inlet and outlet cavities 140, 142 of the cap 132, which are separated by a wall 144. The inlet cavity 140 is in fluid communication with a plurality of the microchannel units 116 and the outlet cavity 142 is in fluid communication with a plurality of the microchannel units 116. For example, a first set of the microchannel units 116 (e.g. the upper microchannel units 116) are manifolded with a corresponding second set of microchannel units 116 (e.g. the lower microchannel units 116). The second fluid thus passes through the receptacle 130 twice to allow further exposure time and thus thermal transfer between the first and second fluids through the heat exchanger 100. In alternative embodiments, microchannels of each microchannel unit are manifolded together (e.g. the microchannels on the right side are manifolded with corresponding microcharmels on the left side of the same microchannel unit), in which case, the wall 144 may be oriented 90° with respect to the orientation shown in FIG. 1. In other alternative embodiments, a second cap is provided at the opposite end of the housing 120, where the inlet 126 is provided at the cap 132 and the outlet 128 is provided at the other cap. The caps may or may not have separation walls 144. The microchannel units 116 may or may not be manifolded together. The second fluid may make a single pass through the receptacle 130 or may multiple passes through the receptacle 130, depending on the particular application.

In an exemplary embodiment, the housing 120 includes a breach chamber 150 and a breach chamber outlet 152 for draining any breach fluid from the breach chamber 150 should a breach in any heat transfer device 110 occur. The breach chamber 150 provides a place for the breaching fluid (e.g. refrigerant/oil/water/waste water) to be contained without damage to the environment or the equipment of the heat transfer system 102, and be drained off. The breach chamber 150 and breach channels of the heat transfer devices 110 may alternatively be used as a hot gas defrost system, such as in the refrigerant evaporator to keep the heat transfer system 102 operational in certain conditions. In the illustrated embodiment, the breach chamber 150 is part of the cap 132, however the breach chamber may be part of the receptacle 130 or may be part of a separate housing element positioned between the receptacle 130 and the cap 132 or positioned elsewhere.

Figure 2:
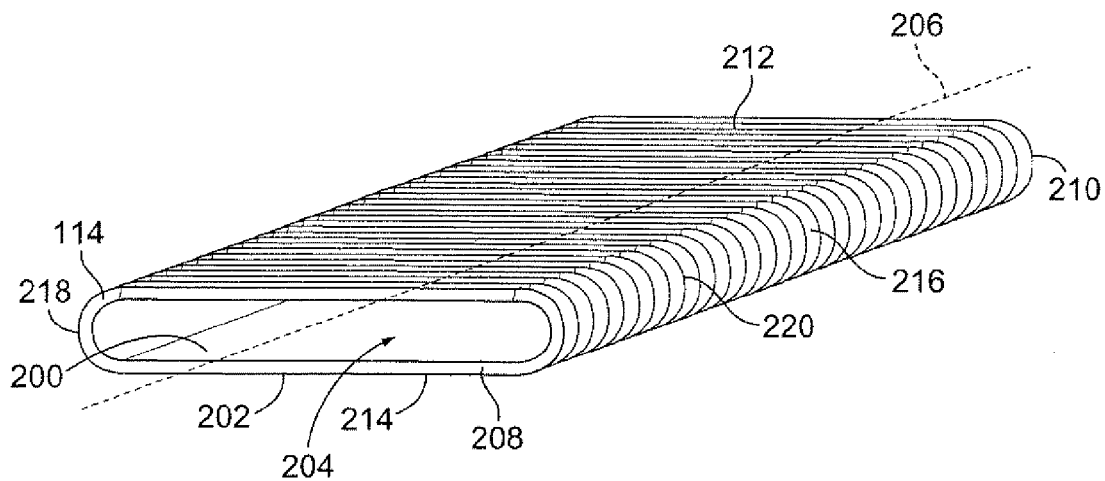
FIG. 2 is a side perspective view of an exemplary outer sleeve for the heat exchanger shown in FIG. 1.

FIG. 2 is a side perspective view of an exemplary outer sleeve 114 for the heat transfer device 110 (shown in FIG. 1). The outer sleeve 114 includes a body defining an interior surface 200 and an exterior surface 202. The interior surface 200 defines a cavity 204 that receives the microchannel unit 116 (shown in FIG. 3). The exterior surface 202 is configured to be in direct thermal communication with the first fluid flowing through the housing 120 (shown in FIG. 1).

The outer sleeve 114 is elongated along a longitudinal axis 206 between a first end 208 and a second end 210. The outer sleeve 114 has a top 212 and a bottom 214 generally opposite the top 212. The outer sleeve 114 has opposite sides 216, 218 between the top 212 and the bottom 214. In the illustrated embodiment, the top 212 and bottom 214 are generally planer while the sides 216, 218 are curved. Other shapes are possible in alternative embodiments. The top 212 is generally parallel to the bottom 214.

In an exemplary embodiment, the outer sleeve 114 is manufactured from a material has good thermal characteristics, such as aluminum or titanium. The outer sleeve 114 may be manufactured from a material having other beneficial characteristics, such as corrosion resistance. Optionally, the outer sleeve 114 may have a coating along the interior surface 200 and the exterior surface 202. The coating may provide good thermal transfer. The coating may provide protection from the environment, such as corrosion resistance. The coating may be a thermal glue. The coating may be a plasma coating, however other types of coatings may be used in alternative embodiments. The coating may provide reduced friction, such as to reduce pressure drop across the outer sleeve 114.

In an exemplary embodiment, the outer sleeve 114 includes interstice enhancements 220 along the exterior surface 202 to increase the surface area of the exterior surface 202 for greater thermal transfer between the outer sleeve 114 and the first fluid. In the illustrated embodiment, the enhancements 220 are defined by fins having grooves or voids there between. The fins may be rectangular in cross section or may have other shapes, such as cylindrical shapes, mound shapes, triangular shapes or other shapes. The enhancements 220 may be elongated (e.g. continue partly are wholly along the surface of the outer sleeve 114, or may be discrete, individual enhancements, such as many pins or bumps on the surface. The enhancements 220 are in direct thermal contact with the first fluid when the first fluid flows through the housing 120. Other types of enhancements may be used in alternative embodiments, such as enhancements having complex shapes, such as curved shapes, helical shapes pigtail shapes, spider-web shapes, cross shapes, have a hub and spoke shape, shapes that allow fluid flow through the enhancements 220, interwoven shapes such as those similar to steel wool, or other shapes depending on the particular embodiment. The enhancements 220 extend into the flow path of the first fluid to define discontinuities or interstices to enhance or increase surface contact with the first fluid. Optionally, the enhancements 220 may have openings that allow the first fluid to flow through the enhancements 220.

Figure 3:
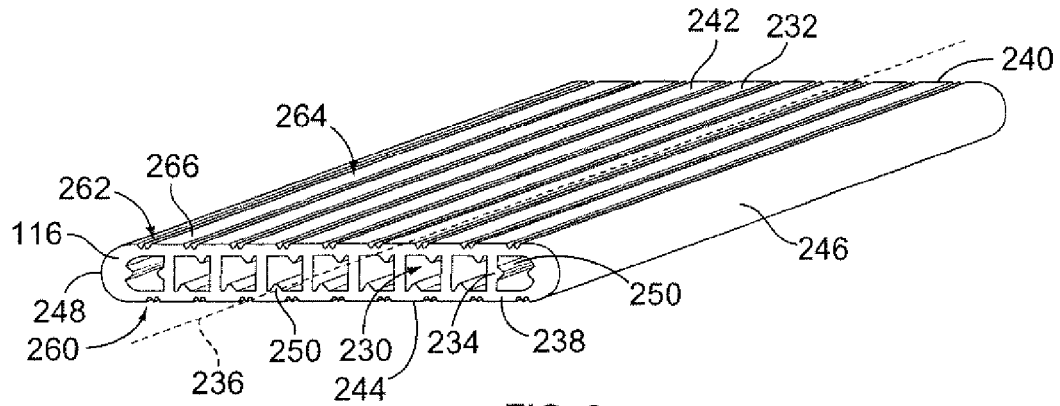
FIG. 3 is a side perspective view of an exemplary microchannel unit for the heat exchanger shown in FIG. 1.

FIG. 3 is a side perspective view of an exemplary microchannel unit 116 for the heat transfer device 110 (shown in FIG. 1). The microchannel unit 116 includes a body with a plurality of microchannels 230 extending there through. The microchannels 230 are configured to receive the second fluid therein such that the body of the microchannel unit 116 is in direct thermal communication with the second fluid. The microchannel unit 116 has an exterior surface 232 that is configured to be in direct communication with the interior surface 200 (shown in FIG. 2) of the outer sleeve 114 (shown in FIG. 2) to transfer heat between the microchannel unit 116 and the outer sleeve 114. The exterior surface 232 is a complementary shape to the interior surface 200. The microchannel unit 116 includes interior walls 234 separating the microchannels 230. Any number of microchannels 230 may be provided, including a single microchannel.

The microchannel unit 116 extends along a longitudinal axis 236 between a first end 238 and a second end 240. The microchannel unit 116 includes a top 242 and a bottom 244 with sides 246, 248 extending there between. In an exemplary embodiment, the top 242 and bottom 244 are planer and generally parallel to one another. The sides 246, 248 are curved. Other shapes are possible in alternative embodiments.

The microchannel unit 116 includes interstice enhancements 250 to increase the surface area of the microchannels unit 116 for greater thermal transfer between the microchannel unit 116 and the second fluid. In the illustrated embodiment, the enhancements 250 extend into the microchannels 230. Any number of enhancements 250 may be provided. In the illustrated embodiment, two enhancements 250 extend into each microchannel 230. More or less enhancements 250 may be provided in alternative embodiments. Optionally, the enhancements 250 may be integrally formed with the microchannel unit 116. Alternatively, the enhancements 250 may be separate from the microchannel unit 116 and loaded into corresponding microchannels 230. In the illustrated embodiment, the enhancements 250 are triangular in cross-section, however other shapes are possible in alternative embodiments. For example, the enhancements 250 may be rectangular or cylindrical in cross section, or may have complex shapes, such as curved shapes, helical shapes, pigtail shapes, spider-web shapes, cross shapes, have a hub and spoke shape, shapes that allow fluid flow through the enhancements 250, interwoven shapes such as those similar to steel wool, or other shapes depending on the particular embodiment. The enhancements 250 may be elongated (e.g. continue partly are wholly along the length of the microchannels 230, or may be discrete, individual enhancements, such as many pins or bumps that extend into the microchannels 230. The enhancements 250 extend into the flow path of the second fluid to define discontinuities or interstices to enhance or increase surface contact with the second fluid. Optionally, the enhancements 250 may have openings that allow the second fluid to flow through the enhancements 250. Optionally, the microchannels 230 may be sized to meet the refrigerant volume and/or velocity of the second fluid flowing through the microchannels 230. Optionally, the microchannels 230 may be larger than a square micron.

The microchannel unit 116 includes a plurality of grooves 260 defining breach channels 262 for the first fluid or the second fluid should a breach in the outer sleeve 114 or the microchannel unit 116 occur. The grooves 260 are formed in the exterior surface 232. In an exemplary embodiment, the grooves 260 are aligned with corresponding microchannels 230. Optionally, one set of grooves 260 may be provided along the top 242 above each microchannel 230 and another set of grooves 260 may be provided along the bottom 244 along the corresponding microchannel 230. Any number of grooves 260 may be provided. In an exemplary embodiment, a plateau 264 extends between corresponding grooves 260. The plateau 264 has a planer, flat surface 266 that is configured to engage the interior surface 200 of the outer sleeve 114 when loaded therein. The direct engagement of the surface 266 of the plateau 264 and the outer sleeve 114 provides good thermal communication between the microchannel unit 116 and the outer sleeve 114. In an exemplary embodiment, the plateaus 264 are wider than the sets of grooves 260 to provide a large amount of surface 266 for thermal transfer between the outer sleeve 114 and the microchannel unit 116. Optionally, the plateaus 264 may be generally aligned with the interior walls 234. In an exemplary embodiment, the grooves 260 are V-grooves formed in the exterior surface 232.

Figure 4:
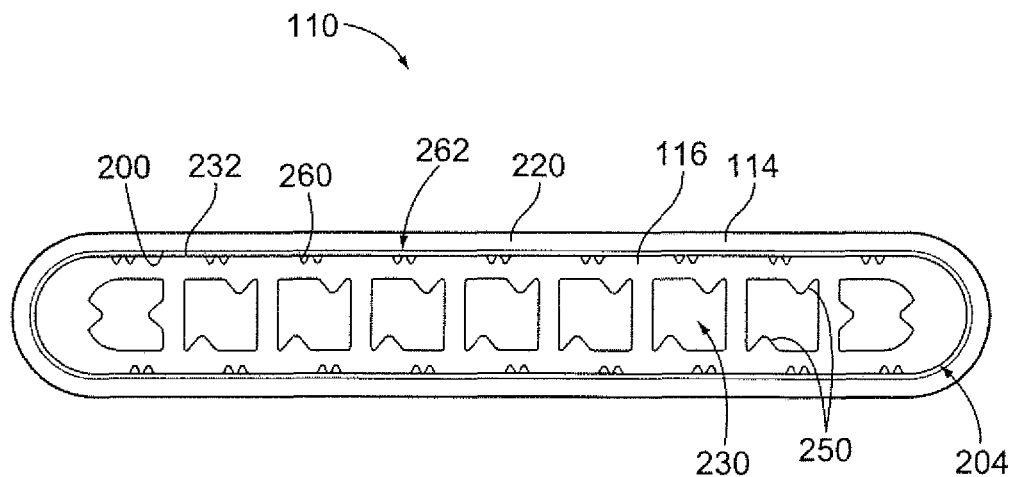
FIG. 4 illustrates a heat transfer device of the heat exchanger showing the microchannel loaded into the outer sleeve.

FIG. 4 illustrates the heat transfer device 110 with the microchannel unit 116 loaded into the outer sleeve 114. The cavity 204 receives the microchannel unit 116 such that the exterior surface 232 of the microchannel unit 116 is in direct thermal contact with the interior surface 200 of the outer sleeve 114. Optionally a coating or thermal interface material may be provided on the interior surface 200 and on the exterior surface 232 to ensure contact between the microchannel unit 116 and the outer sleeve 114 for direct thermal communication there between. Direct thermal engagement means that no appreciable air gap or space occurs between the surfaces, and includes a situation where a coating or thermal transfer material is provided between the surfaces that effects good thermal transfer between the surfaces.

The grooves 260 are illustrated in FIG. 4. The grooves 260 define the breach channels 262. Should a breach occur in the microchannel unit 116 between one or more of the microchannels 230 and the outer sleeve 114, the second fluid flows into the grooves 260 and is drained into the breach chamber 150 (shown in FIG. 1). Should a breach occur in the wall of the outer sleeve 114, the first fluid flows into the grooves 260 and is drained into the breach chamber 150. In an alternative embodiment, the grooves 260 may be provided in the outer sleeve 114 rather than in the microchannel unit 116 wherein the exterior surface 232 of the microchannel unit 116 is smooth and continuous and configured to engage the interior surface 200 of the outer sleeve 114.

In an exemplary embodiment, the grooves 260 represent a minority of the surface area of the interface between the microchannel unit 116 and the outer sleeve 114. For example, the grooves 260 may occupy less than approximately 10% of the surface area of the interface between the outer sleeve 114 and the microchannel unit 116. The remaining approximately 90% of the surface area at the interface between the outer sleeve 114 and microchannel unit 116 is in direct thermal contact to ensure adequate heat transfer between the outer sleeve 114 and the microchannel unit 116.

The heat transfer device 110 decreases the possibility of a cross contamination between the first and second fluids (e.g. refrigerant and potable water or waste water). Optionally, the heat transfer system 102 (shown in FIG. 6) provides an early detection, such as by using sensors, that a wall has been breached, to thereby provide an early indication of a possible cross-contamination situation, thereby allowing for rapid repair thereof.

The exterior surface 232 of the microchannel unit 116 has the longitudinally extending grooves 260 periodically spaced along the length of the exterior surface 232, which will form voids or the breach channels 262 when inserted into the outer sleeve 114. The outer sleeve 114 and the multiport microchannel units 116 may be formed of aluminum or aluminum alloy, or any other suitable material, generally a metal, having the necessary high heat conductivity and structural strength. The void space forming the breach channels 262 would be expected to reduce heat transfer. However, the internal microchannel enhancement 250 and outer sleeve enhancements 220 more than offset the compromise in heat transfer by the voids created by the grooves 260 not intimately contacting the interior surface 200 of outer sleeve 114.

Figure 5:
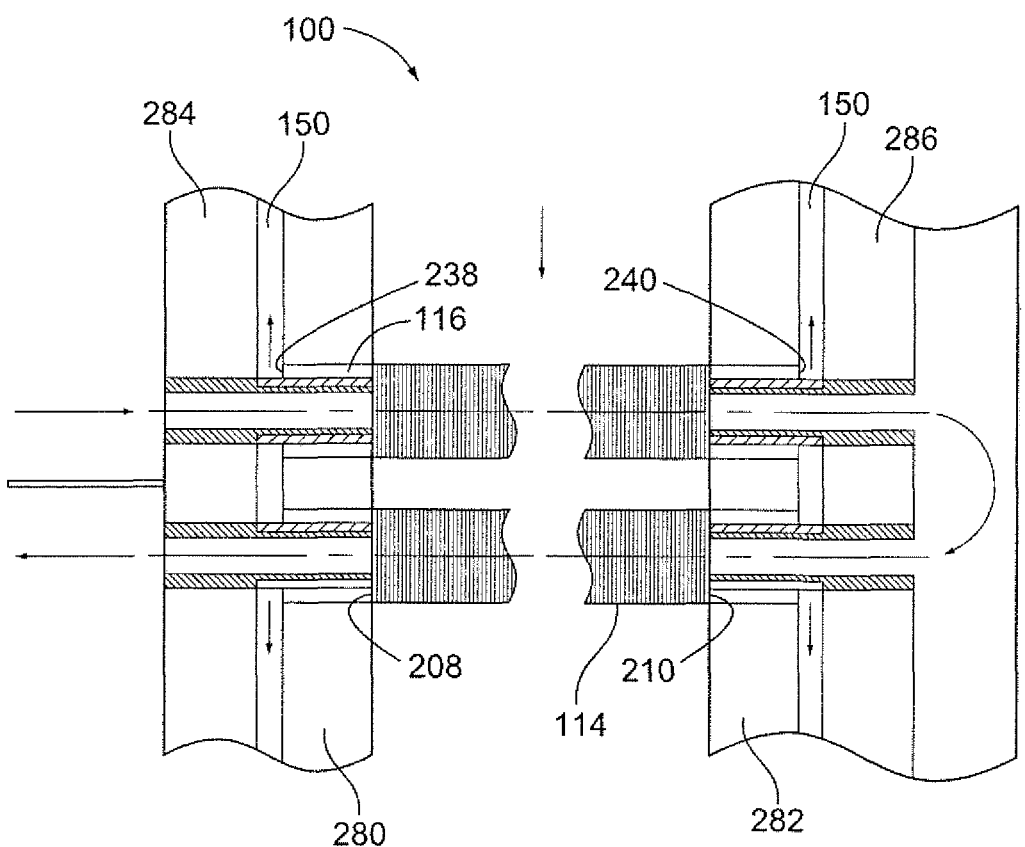
FIG. 5 is a partial sectional view of the heat exchanger.

FIG. 5 is a partial sectional view of the heat exchanger 100. The heat exchanger 100 includes two sleeve supports 280, 282 for supporting the opposite ends 208, 210 of the outer sleeves 114 and two unit supports 284, 286 for supporting the opposite ends 238, 240 of the microchannel unit 116. The breach chamber 150 may be formed between the sleeve supports 280, 284 and/or between the supports 282, 286.

The sleeve supports 280, 282 may support any number of outer sleeves 114. The sleeve supports 280, 282 may be cut or formed to receive and/or support the desired number of outer sleeves 114. The sleeve supports 280 and/or 282 may be formed integral with the housing 120. Alternatively, the sleeve supports 280 and/or 282 may be separate from the housing 120. Optionally, the outer sleeves 114 may be welded, brazed, or otherwise sealed to the sleeve supports 280 and/or 282 to form a unitary member of outer sleeves 114 and sleeve supports 280, 282. Optionally, the ends 238, 240 of the microchannel units 116 may extend past the sleeve supports 280, 282.

The unit supports 284, 286 may support any number of microchannel units 116. The unit supports 284, 286 may be cut or formed to receive and/or support the desired number of microchannel units 116. The unit supports 284 and/or 286 may be formed integral with the housing 120. Alternatively, the unit supports 284 and/or 286 may be separate from the housing 120. Optionally, the microchannel units 116 may be welded, brazed, or otherwise sealed to the unit supports 284 and/or 286 to form a unitary member of microchannel units 116 and unit supports 284, 286.

Figure 6:
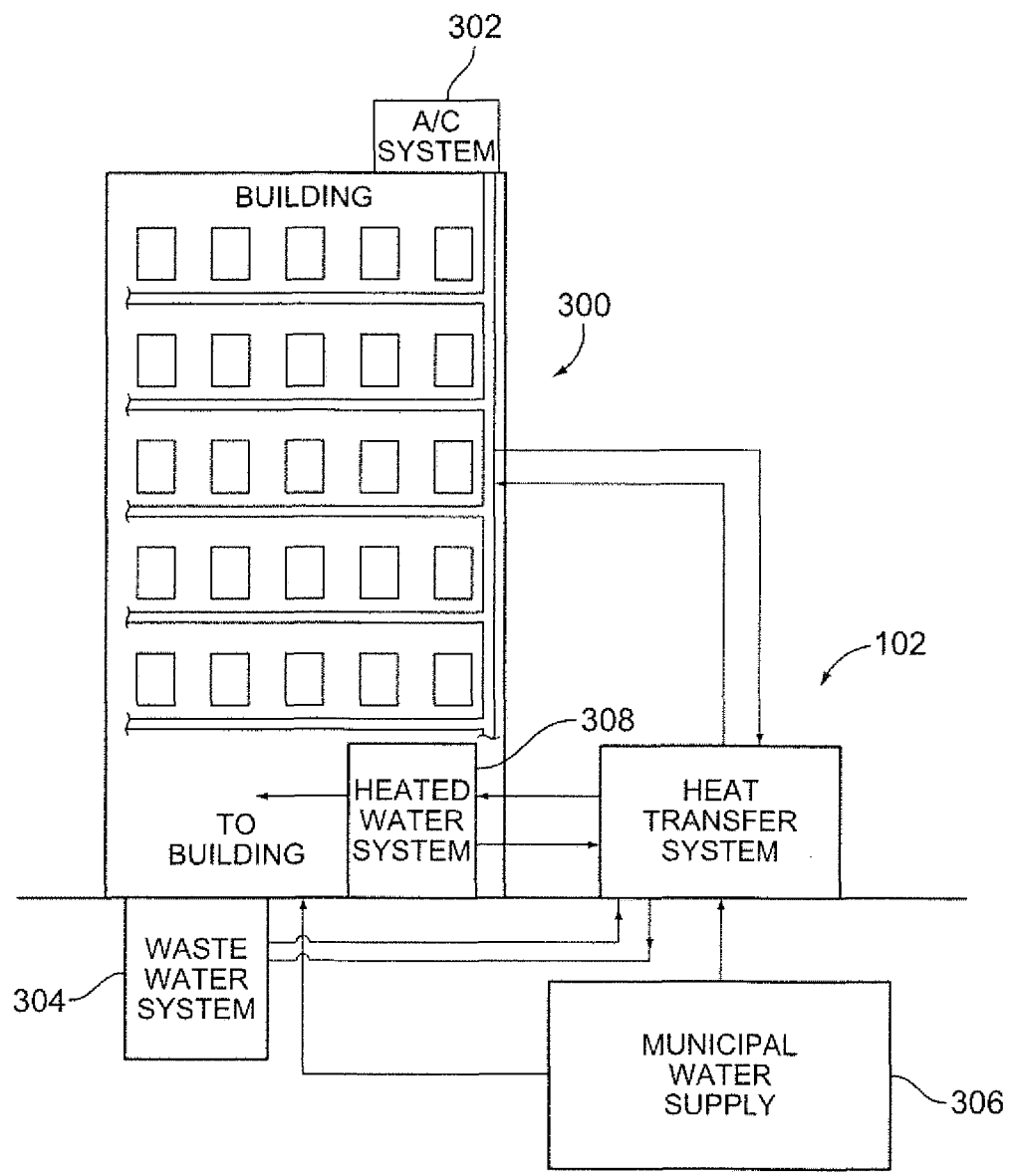
FIG. 6 illustrates a heat transfer system formed in accordance with an exemplary embodiment.

FIG. 6 illustrates the heat transfer system 102 formed in accordance with an exemplary embodiment. The heat transfer system 102 may be positioned in communication with a structure 300 to warm water to be used within the structure. For example, the structure 300 may be a hotel, a hospital, or any other type of structure housing several people in need of warm, potable water. Hospitals, in particular, generally require hot water on demand in great quantities for the purpose of human hygiene and humidity control, i.e., reheat. The heat transfer system 102 provides water suitable for domestic use within the structure 300. The heat transfer system 102 recovers renewable heat from other existing parts of the building, such as the buildings air conditioning system 302 or the waste water system 304 or both. The heat transfer system 102 operates in connection with other water supplies 306, such as a municipal water supply. The heat transfer system 102 may be used to heat a heated water system 308 of the structure 300, such as the heated water system 308 used to supply hot water throughout the structure 300. Alternative embodiments may utilize the heat transfer system 102 in residential applications (e.g. a compact heat pump water heater for a shower enclosure that uses the water going down the drain as a heat source, lowering the cost of heating the water for the shower), other commercial applications, pool heating applications, industrial applications, automotive applications (e.g. as part of the AC system of the vehicle in a refrigerant-to-air or refrigerant-to-liquid system) and the like.

Figure 7:
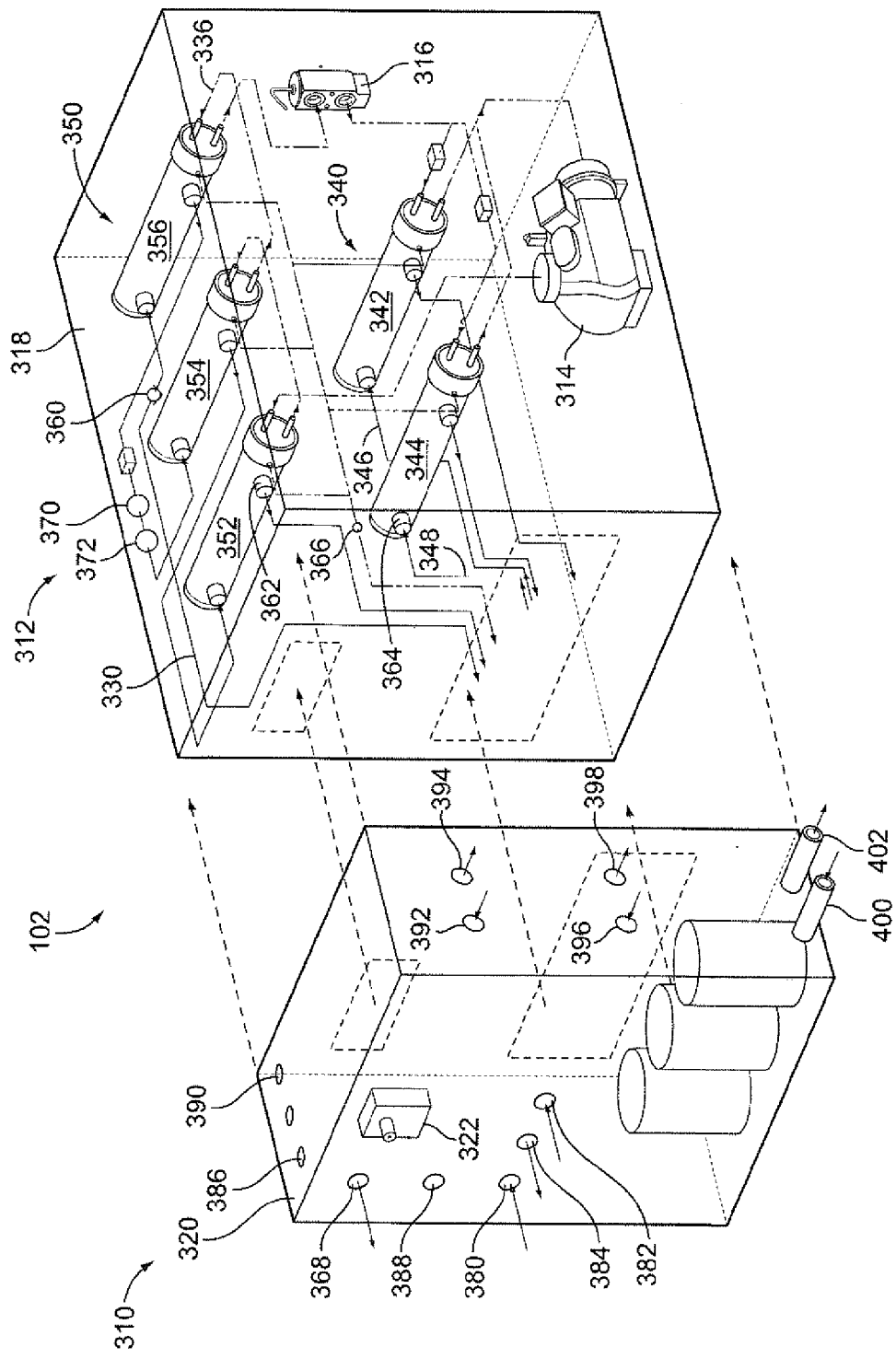
FIG. 7 is a schematic view of the heat transfer system in accordance with an embodiment.
Figure 8:
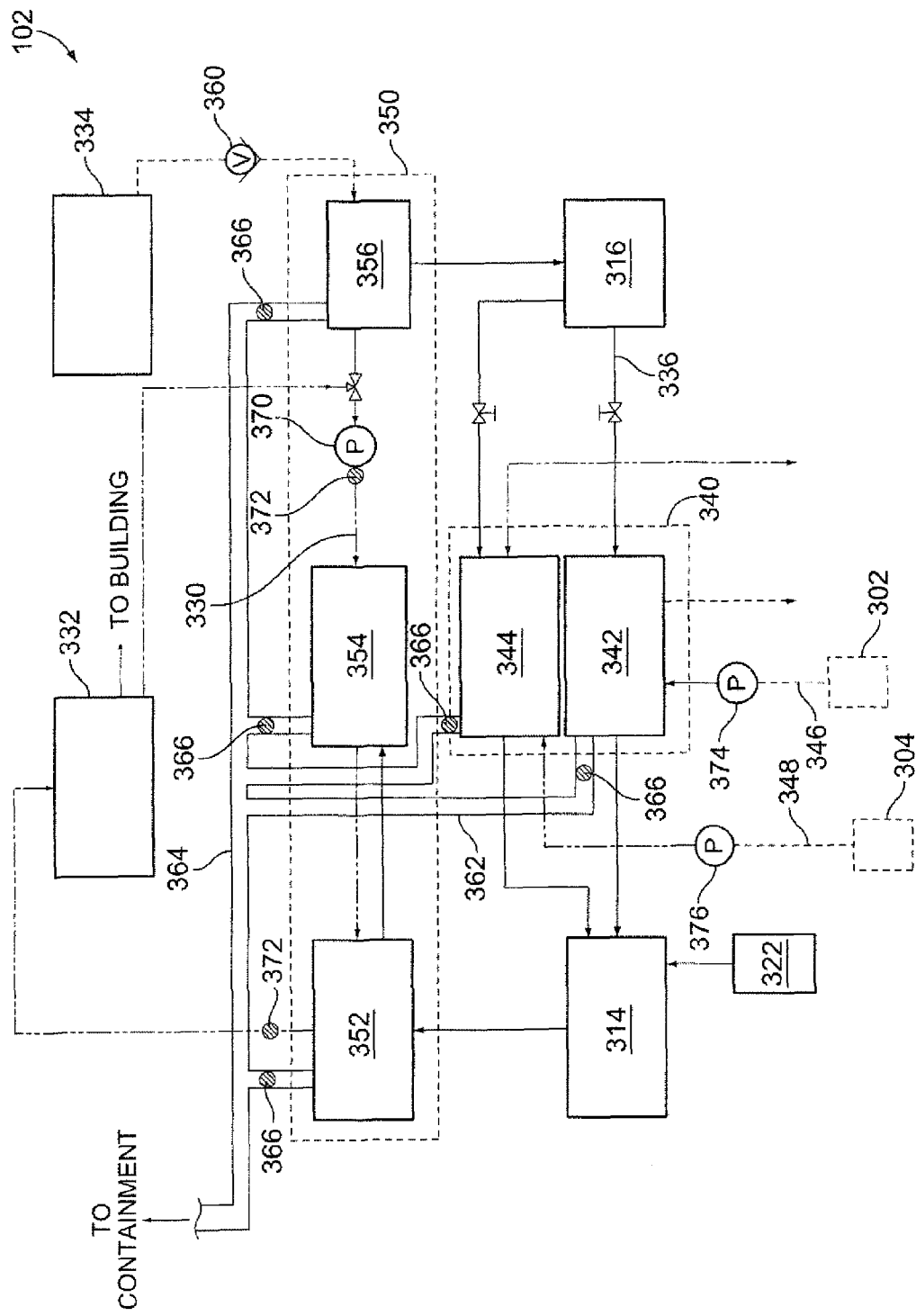
FIG. 8 is a schematic view of a portion of the heat transfer system.

FIG. 7 is a schematic view of the heat transfer system 102. FIG. 8 is a schematic view of a portion of the heat transfer system 102. With reference to FIG. 7, in an exemplary embodiment, the heat transfer system 102 includes multiple sections with separate housings and an interface between the sections. However, in alternative embodiments, the heat transfer system 102 may include a single section with the components thereof housed within a single housing.

The heat transfer system 102 includes an infrastructure connection member (ICM) 310 and an energy transfer member (ETM) 312. The ETM 312 carries the heat exchangers 100 as well as other components for the vapor compression system, such as a compressor device 314, an expansion device 316, pumps, valves, water lines, refrigerant lines, sensors, communication elements, such as wires or transceivers, elements to interface with the ICM 310 and other components of the heat transfer system 102. Optionally, the ETM 312 is sized and shaped to fit within standard doorways and into elevators. This facilitates the retrofit market. The ETM 312 includes a housing 318 that holds the components thereof. The housing 318 may conform to the shape and weight limits of an air cargo container, e.g., ULD3, but those skilled in the art will appreciate that any other housing suitable for containing the components of ETM 312 is possible.

The ICM 310 includes a housing 320 containing components that allow interface with the infrastructure. For example, the ICM 310 may include and/or interface with a power panel, power connections, controllers, global communications devices and connections, pumps and plumbing connections. Optionally, a main controller 322 may be housed in or on the housing 320 to control operation of some or all of the components of the heat transfer system 102.

Optionally, the heat transfer system 102 may be used with a chiller, where the heat transfer system uses the superheat of the chiller to preheat the water to increase the efficiency of the chiller. The heat transfer system 102 may incorporate one or more sleeved microchannel heat exchangers (SMHX) in the ICM 310, such as to pre-heat the water entering the ETM 312.

Referring now additionally to FIG. 8, the components of the heat transfer system 102 are now described in greater detail. The heat transfer system 102 includes a water line 330 for carrying water therein. The water line 330 includes a plurality of individual lines, pipes, tubing, manifolds, fittings and the like making up the water line 330 and interconnecting various components of the heat transfer system 102. The water line 330 generally has a first predetermined flow direction. The water line 330 is in fluid communication with one or more water supplies. For example, in the illustrated embodiment, the water supply may include a first water supply 332 and a second water supply 334. The first water supply 332 may, for example, be part of the heated water system 308, which may or may not include a storage tank. The heated water system 308 may be an existing system in the structure 300 that is heated by steam from a fuel burning boiler tank located within or adjacent the structure 300. The heated water system 308 may be maintained at a temperature of between about 120° Fahrenheit and 140° Fahrenheit. In an exemplary embodiment, use of the heat transfer system 102 may allow the legacy system to be turned off permanently or intermittently depending on demand. In embodiments that are tank-less, maintaining the water within the tank-less system at the predetermined temperature of approximately 120° Fahrenheit advantageously reduces the possibility of human scalding and saves energy over hot water tank systems.

The second water supply 334 may, for example, be the municipal water supply 306. Those skilled in the art will appreciate that the second water supply 334 may also be provided by a well or another source of water. The second water supply 334 may be the water supply normally running into the structure 300. The second water supply 334 generally runs throughout the entire structure 300. Those skilled in the art will appreciate that the water line 330 of the heat transfer system 102 may be tapped into the second water supply 334 at any location.

The heat transfer system 102 also includes a refrigerant line 336 for carrying a refrigerant. The refrigerant line 336 generally has a second flow direction. The second predetermined flow direction may be generally opposite the first predetermined flow direction. Alternatively, the second predetermined flow direction may be transverse or even parallel to the first predetermined flow direction in other embodiments. The refrigerant line 336 includes a plurality of individual lines, pipes, manifolds, tubing, fittings and the like that interconnects various components of the vapor compression system. The refrigerant in the refrigerant line 336 may be a naturally occurring refrigerant. For example, the refrigerant may be provided by carbon dioxide, propane, isobutene, or ammonia or a natural refrigerant blend, such as ammonia-ethane. The refrigerant may also be commonly used synthetic refrigerants, such as R134A, or new synthetic blends such as HFO1234yf.

The heat transfer system 102 also includes water lines 330, 346, 348 for carrying a liquid. The liquid in each of the water lines may be different. The liquid may be water, or may be another fluid. The liquid may be selected to resist freezing. The liquid may include glycols such as propylene glycol or nanofluid-glycol mixture. The liquid may be a nano-fluid, or fluid having nano-particles therein that enhance certain characteristics of the fluid, such as the thermal transfer coefficient.

The heat transfer system 102 includes the vapor compressor device 314, the expansion device 316, an evaporator 340 and a condenser 350 all in fluid communication with the refrigerant line 336. The refrigerant undergoes temperature changes in the vapor compressor device 314, the expansion device 316, the evaporator 340 and the condenser 350 of the vapor compression system when the heat transfer system 102 is operated. The refrigerant undergoes phase changes in the evaporator 340 and the condenser 350 of the vapor compression system when the heat transfer system 102 is operated. The heat transfer system 102 uses the heat exchangers 100 (shown in FIG. 1) to transfer heat from the refrigerant line 336 to the water line 330, 346, 348.

The vapor compressor device 314 may be a dynamic capacity compressor able to rapidly adjust to the dynamic demand of the heated water system 308. The vapor compressor device 314 may be unloading or variable speed or a combination of both. Optionally, more than one vapor compressor device 314 may be utilized to dynamically adjust to demand. The operation of the vapor compressor device 314 may be operated by the controller 322. In an exemplary embodiment, the vapor compressor device 314 is a dynamic capacity compressor that may, for example, be a hermetic or semi-hermetic piston-driven compressor, a rotary compressor, or any other type of dynamic capacity compressor, as understood by those skilled in the art. The vapor compressor device 314 may be driven by an electrical motor or any other type of motor to drive the compressor. The vapor compressor device 314 propels the refrigerant through the refrigerant line 336. The vapor compressor device 314 may operate at different capacities, depending on hot water demand. For example, to operate at different capacities, cylinders of the piston driven compressor may be turned on and off, again, depending on demand. The speed may also be varied to enable the vapor compressor device 314 may to be more dynamically responsive over a wider range of capacity. The vapor compressor device 314 may also be provided by rotary driven compressor. Those skilled in the art will appreciate that the capacity of the vapor compressor device 314 may be adjusted in a rotary driven compressor by simply adjusting the speed of a rotary scroll in the rotary driven compressor depending on demand down to a minimum practical rotation speed.

The expansion device 316 may be a rapid acting device such as a silicon expansion valve able to meter the refrigerant in response to the dynamics of the heated water system 308. Other types of expansion devices 316 are possible in alternative embodiments, such as a pulse motor expansion valve. Optionally, more than one vapor compressor device 314 each with a separate expansion device may be utilized to dynamically adjust to demand.

In an exemplary embodiment, the evaporator 340 includes more than one heat exchanger 100. For example, the evaporator 340 includes a first refrigerant evaporator heat exchanger 342 and a second refrigerant evaporator heat exchanger 344. The heat exchangers 342, 344 may be used together simultaneously either in series or in parallel or may be used individually with only one heat exchanger 342, 344 operating at a time. In an exemplary embodiment, the heat exchangers 342, 344 are in fluid communication with heat source lines 346, 348, respectively. Optionally, the heat source lines 346, 348 come from different heat sources. For example, the heat source line 346 is part of or is in fluid communication with the air conditioning system 302 and the heat source line 348 is part of or is in fluid communication with the waste water system 304. Heat from these sources is used by the heat exchangers 342, 344 to warm the refrigerant in the refrigerant line 336.

In an exemplary embodiment, the condenser 350 comprises a refrigerant desuperheater heat exchanger 352 in fluid communication with the refrigerant line 336 and the water line 330, a refrigerant condenser heat exchanger 354 in fluid communication with the water line 330 and with the refrigerant line 336, and a refrigerant sub-cooler heat exchanger 356 in fluid communication with the water line 330 and the refrigerant line 336. Heat from the refrigerant is used by the heat exchangers 352, 354, 356 to warm the water in the water line 330.

In an exemplary embodiment, during operation of the heat transfer system 102, the refrigerant enters either or both of the refrigerant evaporator heat exchangers 342, 344 as a liquid and is warmed within the refrigerant evaporator refrigerant evaporator heat exchangers 342, 344 to a cooled gas. The interior of the refrigerant evaporator heat exchangers 342, 344 have microchannels with enhanced surface treatment (e.g. enhancements 250 or interstices shown in FIG. 3) and cross sectional area optimized for the designed refrigerant volume of bi-phase liquid to gas heat transfer. The refrigerant may enter either or both refrigerant evaporator heat exchangers 342, 344 at a temperature between about 35° F. and 55° F. and is warmed to a temperature between about 35° F. and 55° F. upon its exit from the refrigerant evaporator heat exchangers 342, 344.

The refrigerant enters the vapor compressor device 314 as a cooled gas and is warmed to a super-heated gas. The refrigerant may exit the vapor compressor device 314 at a temperature between about 150° F. and 185° F. The vapor compressor device 314 pressurizes the refrigerant, thereby increasing the temperature of the refrigerant.

The refrigerant enters the refrigerant desuperheater heat exchanger 352 as a superheated gas (e.g., a gas having a temperature between about 150° F. and 185° F.). Heat from the refrigerant is used by the heat exchanger 352 to warm the water in the water line 330. In the heat exchanger 352, the refrigerant is cooled to a hot gas. In other words, the gas refrigerant is no longer superheated. The interior of the refrigerant desuperheater heat exchanger 352 has microchannels with enhanced surface treatment (e.g. enhancements 250 or interstices) and cross sectional area optimized for the designed refrigerant volume of the single phase gas heat transfer. Optionally, the enhanced surface treatment and/or cross sectional area of the microchannels of the refrigerant desuperheater heat exchanger 352 may be sized and/or shaped differently than in other heat exchangers as they are optimized for the refrigerant phase in the refrigerant desuperheater heat exchanger 352. The refrigerant exiting the refrigerant desuperheater heat exchanger 352 may have a temperature between about 130° F. and 145° F.

The refrigerant enters the refrigerant condenser heat exchanger 354 as a gas. Heat from the refrigerant is used by the heat exchanger 354 to warm the water in the water line 330. In the heat exchanger 354, the refrigerant is cooled and changes state or condenses to a warmed liquid. The interior of the refrigerant condenser heat exchanger 354 has microchannels with enhanced surface treatment (e.g. enhancements 250 or interstices) and cross sectional area optimized for the designed refrigerant volume of a hi-phase gas to liquid heat transfer. Optionally, the enhanced surface treatment and/or cross sectional area of the microchannels of the refrigerant desuperheater heat exchanger 352 may be sized and/or shaped differently than in other heat exchangers as they are optimized for bi-phase (e.g. gas/liquid) in the refrigerant condenser heat exchanger 354. The refrigerant exiting the refrigerant condenser heat exchanger 354 may have a temperature between about 115° F. and 125° F.

The refrigerant enters the refrigerant sub-cooler heat exchanger 356 as a warmed liquid. Heat from the refrigerant is used by the heat exchanger 356 to warm the water in the water line 330 or from second water supply 334. In the heat exchanger 356, the refrigerant is cooled to a cooled liquid. The interior of the refrigerant sub-cooler heat exchanger 356 has microchannels with enhanced surface treatment (e.g. enhancements 250 or interstices) and cross sectional area optimized for the designed refrigerant volume of the single phase liquid heat transfer. Optionally, the enhanced surface treatment and/or cross sectional area of the microchannels of the refrigerant sub-cooler heat exchanger 356 may be sized and/or shaped differently than in other heat exchangers as they are optimized for the refrigerant phase in the refrigerant sub-cooler heat exchanger 356. The refrigerant exiting the refrigerant sub-cooler heat exchanger 356 may have a temperature between about 85° F. and 95° F.

The refrigerant enters the expansion device 316 as a cooled liquid and is cooled to a bi-phase liquid. The expansion device 316 may, for example, be provided by a rapid-acting silicon expansion valve or a pulse motor expansion valve. The expansion device 316 may include an orifice through which the refrigerant must pass. This may cause the refrigerant to partially transform into flash gas. The refrigerant is cooled to a state of liquid and gas. The bi-phase liquid may be described as a bubbling liquid. The temperature of the refrigerant upon exit from the expansion device 316 may be between about 35° F. and 55° F. The refrigerant is thereafter passed to the evaporator 340.

In an exemplary embodiment, the flow of water through the water line 330 of the heat transfer system 102 is used to warm the water for use in the heated water system 308. Water enters the refrigerant sub-cooler heat exchanger 356 and is warmed to a first water temperature. The water flows along the outer sleeve 114 (shown in FIG. 2) and is in thermal communication with the refrigerant via the heat transfer devices 110 (shown in FIG. 1). The water may enter the refrigerant sub-cooler heat exchanger 356 from the second water supply 334 (e.g. the municipal water supply) at a temperature between about 40° F. and 95° F. In an exemplary embodiment, before entering the refrigerant sub-cooler heat exchanger 356, the water passes through a metered valve 360. The water is warmed within the refrigerant sub-cooler heat exchanger 356 to the first water temperature which may be between about 95° F. and 135° F. In an exemplary embodiment, the water is directed to the refrigerant condenser heat exchanger 354 from the refrigerant sub-cooler heat exchanger 356.

In an exemplary embodiment, the water exiting the refrigerant sub-cooler heat exchanger 356 at the first water temperature is mixed with warm water from the first water supply 332 and/or the heated water system 308. The water taken from the heated water system 308 may be taken from the return recirculation thereof or from the storage tank, and may have a temperature between about 95° F. and 135° F. The mixed water temperature defines a second water temperature that is higher than the first water temperature, which may be between about 110° F. and 135° F. Thereafter, the mixed water enters the refrigerant condenser heat exchanger 354 at the second water temperature and is warmed by the refrigerant condenser heat exchanger 354 to a third water temperature. The water flows along the outer sleeve 114 and is in thermal communication with the refrigerant via the heat transfer devices 110. The water is warmed within the refrigerant condenser heat exchanger 354 to the third water temperature which may be between about 115° F. and 135° F. In an exemplary embodiment, the water is directed to the refrigerant desuperheater heat exchanger 352 from the refrigerant condenser heat exchanger 354.

In alternative embodiments, the water from the heated water system 308 may be mixed at other locations other than between the refrigerant condenser heat exchanger 354 and the refrigerant sub-cooler heat exchanger 356. For example, the water may be mixed upstream of the refrigerant sub-cooler heat exchanger 356 or downstream of the refrigerant condenser heat exchanger 354.

The water enters the refrigerant desuperheater heat exchanger 352 at the third water temperature and is warmed to a fourth water temperature, which may be between about 120° F. and 145° F. The water flows along the outer sleeve 114 and is in thermal communication with the refrigerant via the heat transfer devices 110. The water having the fourth water temperature is then re-introduced into the heated water system 308 supply side for use as domestic water within the structure 300.

In an exemplary embodiment, each of the first refrigerant evaporator heat exchanger 342, second refrigerant evaporator heat exchanger 344, vapor compressor device 314, refrigerant desuperheater heat exchanger 352, refrigerant condenser heat exchanger 354, refrigerant sub-cooler heat exchanger 356, and expansion device 316 includes a refrigerant inlet and a refrigerant outlet. The first and second refrigerant evaporator heat exchangers 342, 344 both also include water inlets and water outlets to the heat source lines 346, 348, respectively. Each of the refrigerant sub-cooler heat exchanger 356, refrigerant condenser heat exchanger 354, and refrigerant desuperheater heat exchanger 352 also include a water inlets from the water line 330 and water outlets to the water line 330.

Each of the first refrigerant evaporator heat exchanger 342, second refrigerant evaporator heat exchanger 344, refrigerant desuperheater heat exchanger 352, refrigerant condenser heat exchanger 354, and refrigerant sub-cooler heat exchanger 356 is in communication with a breach line 362. The breach lines 362 are in fluid communication with the breach outlets 152 (shown in FIG. 1) of the heat exchangers 342, 344, 352, 354, 356. Optionally, some or all of the breach lines 362 may be coupled together in fluid communication, such as by a breach manifold 364 or a trunk breach line. One or more breach sensors 366 may be provided in the breach lines 362 and/or breach manifold 364 to detect a breach. A breach chamber exit connector 368 may be provided in the ICM 310. The heat transfer system 102 may be shut down by the controller 322 when a breach is detected at any breach sensor 366. The breached material may be captured and dealt with in an environmentally responsible manner. Optionally, the breach connections to either or both of the refrigerant evaporator heat exchangers 342, 344 may be alternatively linked with valves and controls to create a heating/safety system for the evaporator 340. For example, the breach connections may be connected to the condenser 350 to create a hot gas bypass system to continue safe system operation producing hot water during low evaporator source water temperatures. Heat may be delivered to the evaporator 340 to prevent freezing of the evaporator 340.

In an exemplary embodiment, the heat transfer system 102 includes a hot water pump 370 in communication with the water line 330 to pump water from one or both water supplies 332, 334 through the water line 330. For example, water from the first water supply 332 (e.g. the heated water system 308) may be mixed with water from the second water supply 334 (e.g. municipal water supply) before being pumped through the water line 330 by the hot water pump 370. The hot water pump 370 may be a constant speed water pump or a variable speed water pump, as understood by those having skill in the art. The pump 370 may be controlled by the controller 322 via wired or wireless communication. Optionally, the valve 360 may regulate the amount of municipal water entering the system from the municipal water supply 334 to ensure that a proper amount of water is entering the heat transfer system 102 depending on demand of the users.

In an exemplary embodiment, water from the first water supply 332 (e.g. the heated water system 308) is mixed with water from the second water supply 334 (e.g. municipal water supply) after the water from the second water supply 334 is passed through the refrigerant sub-cooler heat exchanger 356 and before the water is passed through the refrigerant condenser heat exchanger 354. The water from the heated water system 308 may be taken from a hot water storage tank or the return recirculation line of hot water not used by the building devices but cooled by heat transfer from the pipes which may or may not be insulated.

The hot water pump 370 is positioned to pump water from the heated water system 308 and from the water outlet 124 of the refrigerant sub-cooler heat exchanger 356 through the water line 330. The water pump 370 may be a variable speed water pump to advantageously allow for increased and decreased water flow through the water line 330. The hot water pump 370 may be located in the ETM 312 or in the ICM 310. The hot water pump 370 may be powered by an electric motor operationally coupled to the controller 322. The hot water pump 370 may include seals and materials suitable for reliable constant operation at temperatures between 100 and 150° F. Optionally, more than one pump may be utilized in the heat transfer system 102.

The heat transfer system 102 advantageously takes precautions to isolate the refrigerant in the refrigerant line 336 from the water in the water line 330. This advantageously allows the water in the water line 330 to be potable water without cross contamination from the refrigerant or refrigerant and oil mixture. In an exemplary embodiment, the heat exchangers 100 that receive both the potable water and the refrigerant are double walled sleeved microchannel heat exchangers to isolate the water from the refrigerant. The heat exchangers 100 have breach channels 262 that are in fluid communication with the breach chamber 150 and the breach lines 362.

In the heat transfer system 102, the refrigerant may pass through the refrigerant line 336 along with oil. The oil is used to lubricate the components of the heat transfer system 102. There is a risk that a breach may occur in one of the channels of the heat exchanger 100, thereby allowing oil and refrigerant to contaminate the water. The double walled sleeved microchannel heat exchangers used as the refrigerant sub-cooler heat exchanger 356, the refrigerant condenser heat exchanger 354, refrigerant desuperheater heat exchanger 352, and refrigerant evaporator heat exchangers 342, 344 advantageously provide a barrier and a void space between each channel through which the water and refrigerant/oil mixture travels to prevent cross-contamination between the refrigerant/oil mixture and the water while providing a positive means of containment. In the case of any breach initiated in a channel carrying one of the fluids, the fluid that is leaking out of the channel will be contained within the breach channel, and will not cross contaminate the other fluid being passed through the heat exchanger. Where cross contamination is not a concern, other types of heat exchangers may be used, such as single walled heat exchangers. The single walled heat exchangers may utilize microchannels and enhancements as described herein.

The heat transfer system 102 uses breach sensors 366 within the breach channels/lines/manifold to sense the intrusion of any foreign substance. Other sensors may be incorporated within the housing 318 of heat transfer system 102 to detect an event or a leak from the refrigerant line 336, the water line 330, the heat source lines 346, 348 or other components other than the heat exchangers.

The controller 322 is located in the ICM 310, but may be located in the ETM 312 or multiple controllers may be used, such as one or more in the ICM 310 and one or more in the ETM 312. The controller 322 is in communication with the vapor compressor device 314 to control capacity of the vapor compressor responsive to demand. The controller 322 may be remotely operable over a global communications network to control water flow and temperature through the water line 330 responsive to water demand. For example, the controller 322 may be operated remotely via the Internet. The vapor compressor device 314 may be controlled to increase or decrease capacity responsive to the controller 322. The controller 322 may also be used to remotely monitor the heat transfer system 102 and to provide off site maintenance to the heat transfer system 102 (e.g., monitoring and service) over the global communications network. The remote monitoring feature may provide an indication to an operator when preventative maintenance may be necessary, and when other maintenance may be necessary. Accordingly, any down time of the heat transfer system 102 may be advantageously minimized. The controller 322 may be operatively connected to the water pump 370, the valve 360 and other sensors, valves or components of the heat transfer system 102.

In an exemplary embodiment, one or more water temperature sensors 372 may be provided to sense a temperature of the water in the water line 330. The sensor(s) 372 may be in communication with the controller 322. Optionally, the sensor 372 may be positioned adjacent an outlet of the hot water pump 370 for sensing the water temperature of the water being pumped into the refrigerant condenser heat exchanger 354. The sensed water temperature provides an indication of the necessary capacity of the vapor compressor device 314. For example, the sensed water temperature provides an indication to the controller 322 of the hot water demand. Upon sensing a water temperature below a predetermined water temperature, the controller 322 may initiate increased capacity of the vapor compressor device 314. Similarly, upon sensing a water temperature above a predetermined water temperature, the controller 322 may initiate decreased capacity of the vapor compressor device 314 (e.g., turn off some cylinders of a piston driven vapor compressor, or decrease the speed of the screw in a rotary driven vapor compressor).

The water temperature sensor 372 may be positioned adjacent the water outlet 124 of the refrigerant desuperheater heat exchanger 352. Such water temperature sensor 372 monitors the temperature of water being discharged from the refrigerant desuperheater heat exchanger 352 into the heated water system 308. The water temperature sensor 372 may be in communication with the controller 322 so that capacity of the vapor compressor device 314 may be controlled responsive to the sensed water temperature. Accordingly, the heat transfer system 102 may control capacity of the vapor compressor device 314 responsive to any one of a number of factors, including water temperatures monitored throughout the system.

The valve 360 may be positioned adjacent the area where the second water supply 334 is tapped to monitor and regulate the amount of water being introduced into the heat transfer system 102. The valve 360 may be in communication with the controller 322 so that the controller 322 may change capacity of the vapor compressor device 314 responsive to the amount of water being introduced into the heat transfer system 102. The valve 360 may, for example, be a check valve, or any other type of valve, as understood by those skilled in the art.

The first heat source line 346 is in communication with the refrigerant evaporator heat exchanger 342. The heat source of the heat source line 346 may be air conditioning return water of the air conditioning system 302. For example, chilled water air conditioning systems use chilled water to cool the structure 300. The chilled water becomes warmed after it passes through the structure 300 and is returned to a chiller in the air conditioning system to be re-cooled. The heat transfer system 102 taps the air conditioning return water line, extracts warm water from the air conditioning return line, and uses the warmed water in the heat source line 346 to heat the refrigerant passing through the refrigerant evaporator heat exchanger 342. Optionally, the same heat source (e.g. the air conditioning return water) may be used to heat the refrigerant passing through the second refrigerant evaporator heat exchanger 344, such as by taping the second heat source line 348 into the air conditioning return water line. The air conditioning return water is heated from passing through the structure 300. Various factors heat the air conditioning return water such as, for example, sun, lights in the structure 300, and internal heat producing devices. The heat that is extracted from the warm water in the refrigerant evaporator heat exchanger 342 provides most of the heat necessary to heat the refrigerant to the temperature between about 35° F. and 55° F.

A sensor (not shown) may be provided adjacent the heat source line 346. This sensor may be used to sense water temperature coming into and leaving the refrigerant evaporator heat exchanger 342 so that the controller 322 may adjust capacity of the vapor compressor device 314 depending upon the amount of heat available to heat the refrigerant in the evaporator. An air conditioning return water pump 374 may also be included to pump the air conditioning return water through the heat source line 346.

In an exemplary embodiment, the refrigerant evaporator heat exchanger 342 is a double walled sleeved microchannel heat exchanger. Since the air conditioning return water may have a relatively low return water temperature, the heat transfer system 102 may need to be shut down to avoid freezing the evaporator 340, which could potentially destroy the heat transfer system 102 with water breaching into the refrigeration system. In an exemplary embodiment, the intermediate channels or grooves 260 of the evaporator heat exchanger 342 may be advantageously used to bypass hot gas through the evaporator heat exchanger 342 to avoid freezing and keep the heat transfer system 102 online producing hot water.

After the air conditioning return water has been cooled in the refrigerant evaporator heat exchanger 342 (e.g. after heat has been extracted from the water to warm the refrigerant), the return water is returned to the air conditioning chiller to undergo further cooling. Because such water in the air conditioning return line has already undergone cooling in the refrigerant evaporator heat exchanger 342 prior to returning to the air conditioning chiller, the water requires less cooling before being used to cool the rooms. Such system enhances energy savings associated with cooling costs.

Another benefit of using the air conditioning return water to heat the refrigerant in the refrigerant evaporator heat exchanger 342 is a dehumidifying benefit. For example, the heat being extracted from the air conditioning return water is used to heat water in the heated water system 308. The use of the air conditioning return water to heat the refrigerant in the refrigerant evaporator heat exchanger 342 advantageously decreases humidity within the structure 300, thereby decreasing the need for air conditioning within the structure 300, while simultaneously enhancing comfort, as well as energy savings. Those skilled in the art will appreciate that reheating after dehumidification is an effective method of controlling humidity within the structure 300. The reheat dehumidification method is often used in hospitals especially for operating rooms where 50 percent relative humidity must be maintained for proper functioning of the equipment. The hospitals typically use electric resistance re-heaters or fuel based steam or hot water re-heaters, which are very costly to operate. The water in the heated water system 308 produced by the heat transfer system 102 can be advantageously used to dramatically decrease the cost to control the humidity within the structure 300. Maintaining indoor humidity below 60% RH is a key strategy for maintaining good indoor air quality and preventing sick building syndrome. The heat transfer system enables enhanced comfort and indoor air quality while simultaneously saving energy.

The second heat source line 348 is in communication with the second refrigerant evaporator heat exchanger 344. The water source of the heat source line 348 may be filtered waste water or water from an external waste water heat exchanger of the waste water system 304. The waste water system 304 includes the relatively warm water that is used and discharged to main drains from showers, baths, sinks, kitchens, and laundries in the structure 300. Optionally, the same heat source (e.g. the waste water) may be used to heat the refrigerant passing through the first refrigerant evaporator heat exchanger 342, such as by taping the first heat source line 346 into the waste water system 304. The temperature of the waste water may typically range from 50 to 90° F. Sewage water lines, for instance, from toilets, may also be used, usually with a closed loop intermediate heat exchanger. The waste water is normally discharged from the building without taking advantage of this thermal resource. The heat transfer system 102 taps the waste water system 304 and uses the warmed water in the heat source line 348 to heat the refrigerant passing through the second refrigerant evaporator heat exchanger 344. The waste water may be heated passing through the structure 300. Various factors heat the waste water, for example, the air surrounding uninsulated pipes in the structure 300, and internal heat producing devices such as water heaters, washers and dishwashers. The heat that is extracted from the warm water in the refrigerant evaporator heat exchanger 344 provides most of the heat necessary to heat the refrigerant to the temperature between about 35° F. and 55° F.

A sensor (not shown) may be provided adjacent the heat source line 348. This sensor may be used to sense water temperature coming into and leaving the refrigerant evaporator heat exchanger 344 so that the controller 322 may adjust capacity of the vapor compressor device 314 depending upon the amount of heat available to heat the refrigerant in the evaporator. A waste water pump 376 may also be included to pump waste water or closed loop water through the evaporator 340.

In an exemplary embodiment, the refrigerant evaporator heat exchanger 344 is a double walled sleeved microchannel heat exchanger. Since the waste water may have a relatively low water temperature in cold climates, the heat transfer system 102 may need to be shut down to avoid freezing the evaporator 340, which could potentially destroy the heat transfer system 102 with water breaching into the refrigeration system. In an exemplary embodiment, the intermediate channels or grooves 260 of the evaporator heat exchanger 344 may be advantageously used to bypass hot gas through the evaporator heat exchanger 344 to avoid freezing and keep the heat transfer system 102 online producing hot water.

After the waste water has been cooled in the refrigerant evaporator heat exchanger 344 (e.g. after heat has been extracted from the water to warm the refrigerant), the waste water is returned to be discharged as normal or cleaned and reused. Using waste water as an energy source for renewable recovery enables the application of renewable energy water heating to most all buildings regardless of climate or air conditioning type.

Referring now back to FIG. 7, additional details of the ETM 312 and ICM 310 of the heat transfer system 102 are now described. More specifically, and as mentioned above, the ICM 310 includes a plurality of connection members. The connection members may, for example, include a municipal water inlet connector 380. The municipal water inlet connector 380 is preferably a tap or fitting to be connected to the second water supply 334 (e.g. the municipal water supply) running through the structure 300.

Figure 9:
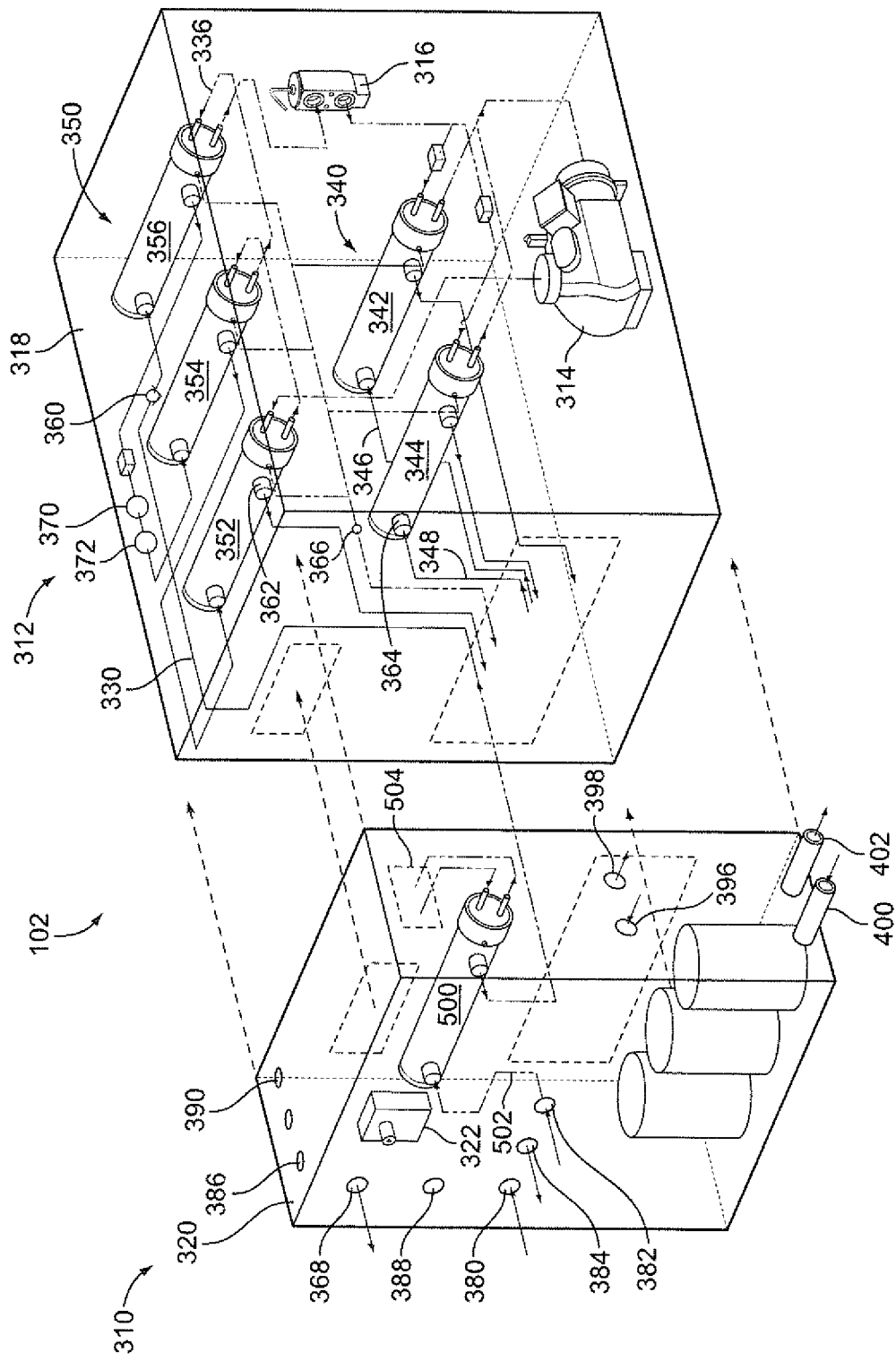
FIG. 9 is a schematic view of the heat transfer system in accordance with an embodiment.
Figure 10:
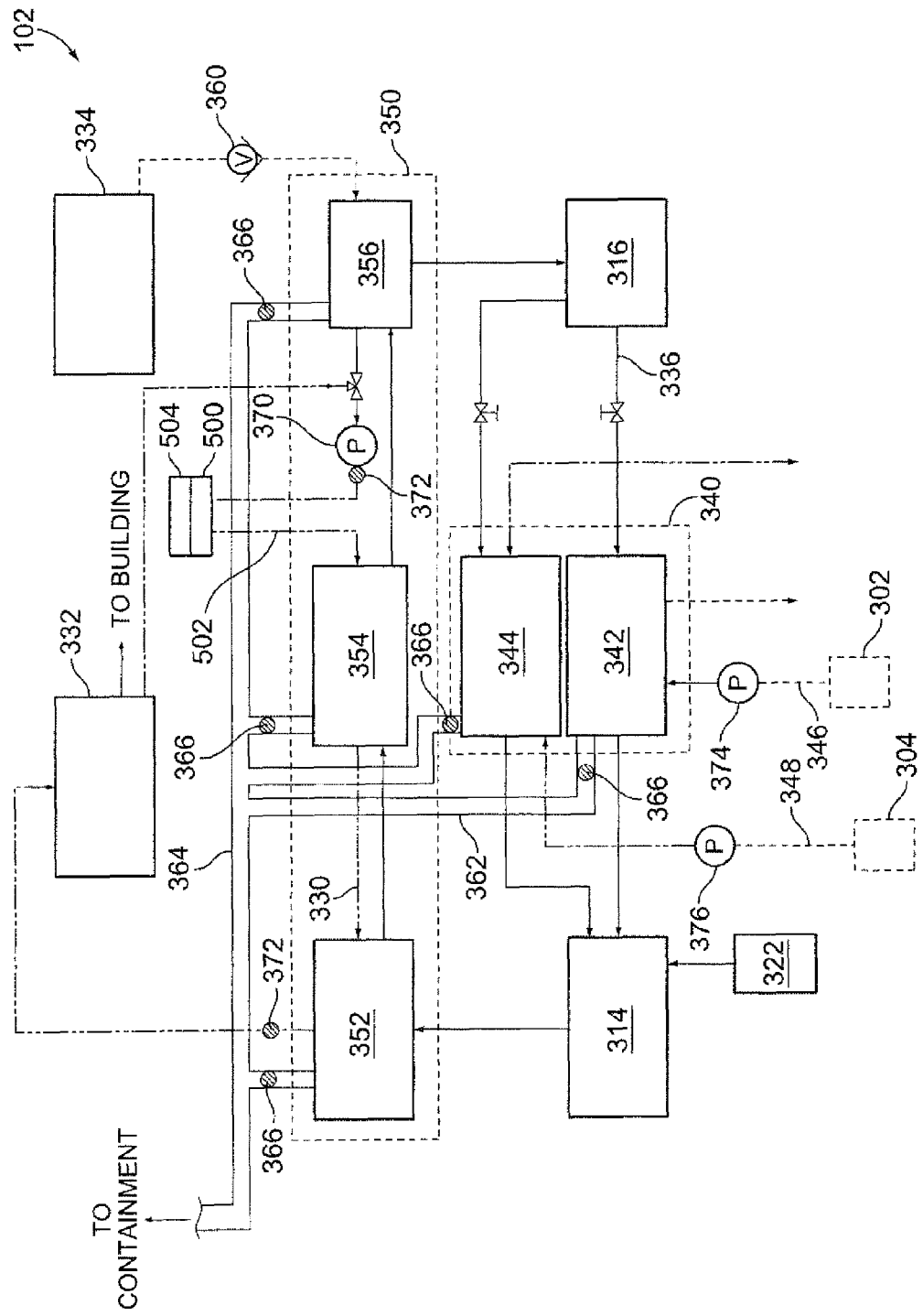
FIG. 10 is a schematic view of a portion of the heat transfer system in accordance with an exemplary embodiment.

The connectors may also include a heated water system inlet connector 382 and a heated water system outlet connector 384. The heated water system inlet connector 382 connects the heat transfer system 102 to the heated water system 308 so that water may be pulled from the return portion of the heat water system 308. The heated water system inlet connector 382 and heated water system outlet connector 384 may be connected to the water line 330. Optionally, one or more sleeved microchannel heat exchangers (SMHX) may be incorporated between the heated water system inlet connector 382 and the water line 330 to pre-heat the water entering the condenser. For example, a SMHX associated with a chiller may be provided (e.g. housed in the ICM 310) for heating the water from the municipal water line prior to entering the refrigerant sub-cooler and/or for pre-heating a mixture of the water existing the refrigerant sub-cooler and return water from building system prior to entering the condenser. FIGS. 9 and 10 illustrate an example of a heat exchanger 500 positioned in the ICM 310 and in thermal communication with a water line 502 in fluid communication with the water line in the ETM 312. The heat exchanger 500 is connected to a chiller 504. Heat exchange occurs between the hot gas refrigerant of the chiller 504 and the water line 502, which may be a mixture of municipal water and heating system return water to enable the chiller 504 to operate more efficiently while enabling the heat transfer system 102 to control temperature at reduced load and higher efficiency.

The connectors in the ICM 310 include a power source connector 386. The power source connector 386 is used to connect the heat transfer system 102 to a power source within the structure 300. Those skilled in the art will appreciate that the power source connector 386 may be used to connect to the power running through the structure 300, or may be used to connect to an external power source not associated with the structure 300.

The connectors in the ICM 310 include a controller connector 388 and a global communications network connector 390. The controller connector 388 may be used to connect the controller 322 of the heat transfer system 102 to a user interface. For example, the user interface may be a computer located on-site at the structure 300. The global communications network connector 390 advantageously allows the controller 322 of the heat transfer system 102 to be connected to a global communications network, such as the internet, so that the heat transfer system 102 may be remotely operated and monitored.

The connectors in the ICM 310 include an air conditioning return water inlet connector 392 and a chilled water outlet 394 so that the return air conditioning water may be routed into the evaporator 340 to be used to warm the refrigerant running therethrough. The connectors in the ICM 310 include a waste water inlet connector 396 and a waste water outlet 398 so that the waste water may be routed into the evaporator 340 to be used to warm the refrigerant running therethrough.

The heat transfer system 102 may include a refrigerant scavenger system to control refrigerant released into the ETM 312. Although refrigerant release into the ETM 312 is unlikely, it is advantageous to have a system to monitor such a release, and evacuate the refrigerant released within the ETM housing 318. The ETM 312 may include a refrigerant sensor (not shown), an air inlet 400, and a refrigerant vent 402 to allow refrigerant to be vented from the ETM 312. More particularly, the sensor may sense refrigerant concentration within the ETM 312 and may vent the refrigerant form the housing 318 or, if necessary, allow air into the housing 318 through the air inlet 400. The air inlet 400 may, for example, introduce filtered air into ETM 312.

A plurality of heat transfer systems 102 may be provided at a particular structure 300. The heat transfer systems 102 may be arranged in circuits, each with independent refrigerant lines 336 and water lines 330, operating in series or in parallel. The plural heat transfer systems 102 may be rated to meet capacity requirements of a particular structure 300. The use of a plurality of circuits and the capability to easily remove and replace the ETM 312 facilitates service, replacement and upgrade of the heat transfer system(s) 102.

The heat transfer system 102 is capable of being integrated with other building systems such as chillers, boilers, and waste water treatment system. The ICM 310 may have software compatible with open protocols through the other building systems. This communication may be hard wired, wireless or through the global communication system. For example a plurality of heat transfers systems 102 may be incorporated through the structure 300, which may be a resort hotel complex. There may be a periodic need for a sudden large hot water heating load. For example, during winter the indoor and outdoor pool may need to be heated, simultaneously the laundry may need hot water while there is a coincident need for guest room hot water. The networked heat transfer systems 102 sense the aggregate high hot water load and communicate with the chillers to advantageously shut them off and the cooling and hot water are simultaneously provided with the same kilowatt investment in the multiple heat transfer systems 102. Moreover, communications with hot water boilers may be summoned on or off. Communication with waste water treatment system may also aid in the heat transfer system 102 making decisions as to the most optimum heat resource to use.

An alternative embodiment of the heat transfer system 102 is to be integrated into a product system of an original equipment manufacturer, for example an air conditioning chiller, hot water boiler or waste water treatment system. For example, the heat transfer system 102 may be integrated with a chiller's desuperheating heat exchanger to use as pre-heat or post-heat. This is especially efficient in chiller systems using natural refrigerant ammonia, as ammonia has much higher quality of temperature than other refrigerants, such as the synthetic refrigerant R134a. Chillers with HFC134a or HCFC 123 often have relatively low refrigerant superheat temperatures to obtain approximately 140° F. of hot water temperature and a compact heat transfer system 102 may be fitted onto the available real estate on the chiller with an optionally added SMHX desuperheater to use the available heat in the chiller system as preheat. The efficiency of the chiller may be increased by incorporating the benefits of the heat transfer system described herein. A manufacturer of boilers may integrate the heat transfer system 102 into products. For example the heat source of heat transfer system 102 may be periodically unavailable, such as the winter months when a chilled water system is shut down and waste water heat recovery is not feasible. The integrated boiler system may take over the production of hot water till such time that the heat source becomes available. A manufacturer of waste water treatment systems may want to integrate the heat transfer system 102 into products to add the value of providing the facility with hot water by advantageously using the thermal benefits of the treated water before disposal or reuse.

A method of warming water for a water supply is provided by the heat transfer system 102. The method includes propelling a refrigerant through the refrigerant line 336. The refrigerant passes through the evaporator 340 to warm the refrigerant to a cooled gas, a vapor compressor device 314 to heat the cooled gas to a super-heated gas, a condenser 350 to cool the super-heated gas to a warmed liquid, and an expansion device 316 to cool the warmed liquid to a hi-phase liquid, and back to the refrigerant evaporator.

The method also includes pumping water, such as using a variable speed water pump, through the water line 330 adjacent the refrigerant line 336 to absorb heat from the refrigerant. The water passes through the condenser 350 to be warmed to a predetermined water temperature, and exits the condenser 350 to be delivered to the heated water system 308.

The method also includes operating a controller 322, such as remotely or automatically, to control capacity of the vapor compressor device 314 responsive to demand by varying the speed and or unloading of the vapor compressor device 314. The water line 330 and the refrigerant line 336 are isolated from one another in double walled sleeved microchannel heat exchangers 100. The heat exchangers 100 have grooves 260 that define breach channels 262 should a breach occur through either wall.

Another method includes using the heat transfer systems 102 for doing business. The heat transfer system 102 may be installed at a large structure 300, such as a hospital. Use of the heat transfer system 102 enhances monetary savings by decreasing the costs of operating a traditional system to heat water. For example, the heat transfer system 102 decreases fuel costs associated with typical fuel burning hot water heaters. Accordingly, a certain cost savings is attributed to the heat transfer system 102. The heat transfer system may be installed at the structure 300 and leased to the owner of the structure 300.

Having the heat transfer system 102 split between ICM 310 and ETM 312 may promote the leasing business model. The building owner may elect to purchase the ICM 310 and use locally qualified technicians to perform the necessary integration to the heated water system 308, the water supply 306, the air conditioning system 302, the waste water system 304, the power connection from the structure 300, other building systems, the communication link, and the like. Experts may be in contact with the local installation team through the internet and the system infrastructure connection may be tested prior to the integration of ETM 312.

The ETM 312 may be the leased portion of heat transfer system 102 for a predetermined period. This period may be, for example, 60 months. The lease may include service and maintenance for the entire integrated heat transfer system 102, which may be monitored, serviced and assured over the internet. The lease payments may, for example, be directly attributed to fuel cost savings associated with decreased energy costs. By making the ETM 312 easily detachable, the ETM 312 may be upgraded at the end of the lease period or may have a technology upgrade guarantee. The ETM 312 may be advantageously recycled by the manufacturer with assured customers for the long term constantly improving the delivery of value. Any type of formula may be used to determine lease payments that are directly related to energy cost savings and value. Sale or lease of all or part of the heat transfer system 102 to the owner of the structure 300 may be related to estimated energy cost savings and or the possibility of carbon credits.

Another method of using the heat transfer system 102 may include use for obtaining carbon credits. There exists a certain number of carbon emissions associated with burning fuel to produce energy. The avoidance of carbon emissions are defined as carbon credits. Carbon credits are related to tons of carbon dioxide avoided from atmospheric discharge. For instance, the structure 300 may have an existing furnace to heat water with a known fuel. The furnace efficiency and carbon dioxide emission are based on usage. The heat transfer system 102 can be retrofitted making the existing heating system redundant. Accordingly, the fuel valves may be turned off and carbon dioxide emissions may be eliminated.

The heat transfer system 102 enhances fuel savings for the structure 300. The owner of the heat transfer system 102 may generate carbon credits where the heat transfer system 102 is configured with software to calculate the tons of carbon saved as the calculation is transmitted in real time through the global communication link. The structure 300 using the heat transfer system 102 does not require as much fuel to produce energy to heat water as may be required by a structure that does not have the heat transfer system installed therein. Therefore, emissions of carbon dioxide at such a structure are greatly decreased.

The owner or lessor of the heat transfer system 102 may also have excess carbon credits. These carbon credits may be traded as a commodity. In other words, the excess carbon credits may be sold. The software in the heat transfer system 102 could be certified and audited by a third party to assure integrity of the amount of carbon tons being saved from discharge and sold. The owner of the heat transfer system 102 and/or the lessor of ETM 312 advantageously benefits from fuel savings associated with the heat transfer system 102 (e.g. decreased costs of heating potable water and decreased costs of cooling air in air conditioning system), and also monetarily benefits from the sale of carbon credits. The carbon credits may also be accumulated by the owner and/or lessor for use to fund future development.

In an exemplary embodiment, the heat transfer system 102 creates a cost effective and efficient heat pump water heating system with sleeved microchannel heat exchangers (SMHX) that transfer heat from a refrigerant to a fluid while simultaneously decreasing the possibility of cross-connection between the two. These SMHX heat exchangers when applied in the evaporator are uniquely tolerant to breaching in a freezing situation. The SMHX have a removable barrel that is corrosion resistant and serviceable making the recovery from waste water or ground water systems practical for heat pump water heating in all climates and water systems.

In an exemplary embodiment, the heat transfer system 102 uses advanced microchannel heat transfer technology in the field of heat pump water heating. Each single microchannel within a plurality of microchannels, known as a multiport microchannel, has enhanced surface treatment, which may be angular, curved, hollow, solid or include openings therethrough, on the interior of each single microchannel. Each single microchannel has a cross sectional area greater than 1 micron$^2$ (one square micron). In the desuperheater SMHX, the geometry of surface area and volume of the microchannels are optimized for single phase refrigerant gas heat transfer. In the condenser SMHX, the geometry of surface area and volume of the microchannels are optimized for bi-phase gas to liquid refrigerant heat transfer. In the sub-cooler SMHX, the geometry of surface area and volume of the microchannels are optimized for single phase refrigerant liquid heat transfer. In the evaporator SMHX, the geometry of surface area and volume of the microchannels are optimized for bi-phase liquid to gas refrigerant heat transfer. The use of microchannel heat transfer technology reduces the amount of refrigerant charge required as well as the amount and applied cost of the material. Lower cost and higher efficiency are the result.

In an exemplary embodiment, the heat transfer system 102 provides a system with SMHX heat exchangers incorporating an intermediate chamber such that if a breach were to occur in either the refrigerant side or the fluid side, such breach substance would be contained in a separate compartment and eliminated rather than the occurrence of cross contamination. Alternatively, the intermediate channel in the SMHX, when applied in the evaporator, incorporates a cost effective hot gas defrost system which enables the heat pump water heater to maintain hot water production when relatively low temperatures are available from the heat source for such evaporator (e.g. when using an air conditioning system or waste water system as the heat source for the evaporator heat exchanger) without compromising the system or the hot water temperature.

In an exemplary embodiment, the heat transfer system 102 introduces an advantageous split of the heat transfer units into two components which promote a business method of positive cash flow leasing. The components that are attached to the infrastructure, such as the plumbing, pumping, power and global communications, are grouped and housed in an infrastructure connection member which may be sold separately from the second unit and shipped ahead of the second unit for pre-installation. The ICM may have a quick connect interface to the other unit. The components used for the heat transfer, such as the heat exchangers, compression and expansion devices, and the like, are advantageously grouped and housed in a another unit or housing known as the energy transfer member. The ETM may have a quick connect interface which is adapted to mate with the ICM. The ETM may advantageously use a business method of positive cash flow leasing where, for a fixed period of a predetermined amount of time, the customer may pay a monthly lease fee, including service, which is substantially less than the fuel cost of the legacy fuel burning system. The ETM components are designed to be repaired, replaced, serviced, maintained and/or recycled during or after each lease period, sustainably reducing cost over a long term period. The ETM may be in a housing that may be shaped to the dimensions and weight limits of transportation containers. The most popular aircraft container shape, known as the ULD3, may be used. The ICM and ETM may be designed to fit through standard doorways and into standard elevators to accommodate the retrofit market.

In an exemplary embodiment, the heat transfer system 102 is applicable in warm and cool climates as well as buildings without chilled water air conditioning system. Most commercial buildings discharge vast quantities of waste water generally at temperatures from 50 to 90° F. This is an excellent source of heat, yet to be fully exploited. The sleeved microchannel heat exchanger (SMHX) is designed to recover heat from waste water such as may be normally discharged from showers, baths, kitchens and laundry. The SMHX is serviceable with a removable barrel to easily perform maintenance and/or cleaning on the water side if necessary. An intermediate water loop heat exchanger may also be used in the case of recovery from sewage systems. A second SMHX evaporator may be incorporated into the units. This allows for summer operation and heat recovery from a chilled water system from SMHX1 evaporator and winter operation with heat recovery from waste water with SMHX2. Alternatively both SMHX evaporators may recover heat from waste water. One SMHX evaporator can be used to back up the other maintaining hot water production even during maintenance. This advantageously increases reliability and up time which is particularly important with a leasing business model.

In an exemplary embodiment, the heat transfer system 102 may be used for transferring heat from a refrigerant system of a mobile air conditioning system, such as an AC system in a vehicle. The AC system may use a natural refrigerant, such as propane or ammonia. The heat transfer system 102 may define a mini SMHX R290 (propane) chiller system with micro-pumps coupled with a glycol or nanofluid. The system could be efficient, low cost, safe and add value by providing more individual control of not only the temperature but humidity as well.

In an exemplary embodiment, the heat transfer system 102 may be used as part of a business method of obtaining carbon credits to incentivize innovation on a global scale.

Traditional vented double wall heat exchangers are both costly and inefficient due to added material and the resistance to heat transfer of the double wall. In an exemplary embodiment, the heat transfer system 102 uses microchannel heat exchanger technology with enhanced interior surfaces and enhanced interfacing between the microchannel unit and outer sleeve of the SMHX to lower applied cost while increasing efficiency.

In an exemplary embodiment, the heat transfer system 102 is configured for use with water resource systems that have corrosive effects. In order to maintain the needed high heat conductivity of the system, the SMHX maintain superior corrosion resistance. This is maintained by the use of proper materials of construction, which can include, for example, plasma coating of surfaces of the SMHX in contact with the offending fluid. Primary corrosion resistant materials, such as Titanium or Titanium-Aluminum alloys may also be used, as well as any other corrosion-resistant coatings. Lease term reliability and low service cost are achieved.

In an exemplary embodiment, the heat transfer system 102 include heat exchangers that allows the usage of low global warming naturally occurring refrigerants for heat pump water heaters, recovering from any and all heat resources including, but not limited to, chilled water and condenser water AC systems, waste water systems, ground water and natural water streams. The natural refrigerants may include ammonia (R-717), carbon dioxide (R-744), hydrocarbon refrigerants, e.g., propane (R-290), and isobutane (R-600a). Aluminum microchannel based heat exchangers are particularly well suited to ammonia refrigerant. Synthetic refrigerants may also be applied. The heat exchangers allow for cost effective upgrading to a natural refrigerant within the unit's useful life.

In an exemplary embodiment, the heat transfer system 102 addresses the energy efficient advantage of dynamically delivering instantaneous hot water at 120° F. instead of 140° F. by use with a heated water system that does not include a storage tank. The vapor compression system may be dynamic to accommodate for the demand of hot water, for instance by providing a compression with capacity to handle the peak load and unloading, complimented by variable speed devices, such as pumps, and wide range and rapid acting silicon expansion devices and system actuated controls.

In an exemplary embodiment, the heat transfer system 102 operates to produce hot water in unison with other mechanical systems of the building. These may include chillers, boilers, or a waste water recovery system. The heat transfer system 102 may provide communication connections to these other mechanical components via hard wiring, wireless or the global communications network. Through open protocol software, coordinated operation may be achieved. For instance, advantageous communication access to chillers within the building may enable reclaimed heat from the chiller's desuperheaters to be used to preheat potable water, thereby increasing overall efficiency. The heat transfer system 102 may signal and sequence operation with a back up boiler or water beater. The heat transfer system may include a decision engine, computer or controller that decides whether it is more advantageous to recover heat from a waste-water source or a return chilled water source and, accordingly, shift operation to the most efficient recovery mode as determined by the decision engine.

In addition to standalone operation of the heat transfer system 102, the heat transfer system 102 may be integrated into a product of an original equipment manufacturer. The heat transfer system 102 may, for instance, be integrated into a chiller advantageously providing simultaneous cooling and water heating, eliminating the need to burn fuel for water heating at optimized electrical utilization. The heat transfer system may also be advantageously integrated with a fuel fired boiler or water heater with complementary or back-up operation.

In an exemplary embodiment, the heat transfer system 102 includes two evaporator SMHXs with isolation valves. This advantageously enables application of the heat transfer system 102 in most buildings, regardless of geographical location. Buildings with a chilled water system and 365 days of cooling with chilled water would most likely recover only from the return chilled water system and use only one evaporator SMHX. However, buildings in cooler climates with chilled water air conditioning systems may shut their AC system off during the winter season. Such applications may use one evaporator SMHX to recover from the return chilled water system during the summer months. This is advantageous because beneficial heating and cooling may be accomplished with the same kilowatt electricity investment. During the winter the other evaporator SMHX may be connected to the waste water system recovering heat from water that is normally disposed from showers, baths, sinks, laundry, and kitchen. Alternatively a closed loop external heat exchanger may recover heat from the sewage system (or waste water system) prior to disposal or water treatment. The heat source may be from the discharge of a waste water recovery plant or any nearby fluid heat source such as ground water, lake water or seawater. There are buildings that do not have chilled water systems to recover heat from or are located in cooler climates without air conditioning systems. In this case heat recovery to produce hot water without burning fuel may be accomplished by recovering from waste water year around or from ground water or any water source that is available. In this case these open loop systems often have corrosive tendencies or need periodic maintenance on the water side.

With one of the SMHX evaporators actively recovering heat and the system producing hot water, the other SMHX barrel may be easily removed and cleaned as is necessary. The enhanced surface sleeves of the SMHX may be advantageously constructed of corrosion and erosion resistant material such as titanium or titanium alloy. These enhanced surface sleeves may also be coated with corrosion resistant and friction reduction coating. Other coatings may be advantageously used as this technology improves.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A heat transfer system comprising:
   a liquid line for carrying liquid;
   a refrigerant line for carrying a refrigerant;
   a refrigerant desuperheater heat exchanger in fluid communication with the refrigerant line and the liquid line, wherein the refrigerant enters the refrigerant desuperheater as a superheated gas and is cooled to a hot gas;
   a refrigerant condenser heat exchanger in fluid communication with the liquid line and the refrigerant line, wherein the refrigerant enters the refrigerant condenser as a hot gas and is cooled to a warmed liquid; and
   a refrigerant sub-cooler heat exchanger in fluid communication with the liquid line and the refrigerant line, wherein the refrigerant enters the refrigerant sub-cooler as a warmed liquid and is cooled to a cooled liquid;
   wherein the liquid enters the refrigerant sub-cooler heat exchanger and is warmed, the liquid enters the refrigerant condenser heat exchanger and is warmed, and the liquid enters the refrigerant desuperheater heat exchanger and is warmed; and
   wherein the refrigerant desuperheater heat exchanger, the refrigerant condenser heat exchanger, and the refrigerant sub-cooler heat exchanger are sleeved microchannel heat exchangers each having a microchannel unit received in an outer sleeve and in thermal communication therewith, the refrigerant passing through the microchannel unit and in thermal communication therewith and the liquid passing along an exterior of the sleeve and in thermal communication therewith, the microchannel unit having a solid body defining a plurality of microchannels therein, the body having walls entirely surrounding each microchannel such that the refrigerant in the microchannels is contained in the microchannels and isolated from the outer sleeve.

2. The heat transfer system of claim 1, wherein the outer sleeve has an interior surface defining a cavity and an exterior surface, the exterior surface being configured to be in direct thermal communication with the liquid, and wherein the microchannel unit is received in the cavity, the microchannels configured to receive the refrigerant therein and be in direct thermal communication with the refrigerant, the microchannel unit has an exterior surface in direct thermal communication with the interior surface of the outer sleeve to transfer heat between the exterior surface and the interior surface, at least one of the interior surface of the outer sleeve and the exterior surface of the microchannel unit have grooves defining breach channels for the liquid or the refrigerant should a breach in the outer sleeve or the microchannel unit occur.

3. The heat transfer system of claim 2, wherein the outer sleeve and microchannel unit define a heat transfer device, the heat exchanger further comprising a housing holding a plurality of the heat transfer devices, the housing having an inlet and outlet for the liquid, the housing having an inlet and outlet for the refrigerant.

4. The heat transfer system of claim 3, wherein the housing has a breach chamber in fluid communication with the breach channels of a plurality of the heat transfer devices, the breach chamber collecting the liquid or the refrigerant should a breach in the outer sleeve or the microchannel unit occur.

5. The heat transfer system of claim 1, wherein each of the refrigerant desuperheater heat exchanger, refrigerant condenser heat exchanger and refrigerant sub-cooler heat exchanger comprise a refrigerant inlet and a refrigerant outlet.

6. The heat transfer system of claim 1, wherein each of the refrigerant desuperheater heat exchanger, the refrigerant condenser heat exchanger, and the refrigerant sub-cooler heat exchanger include a refrigerant inlet, a refrigerant outlet, a liquid inlet and a liquid outlet.

7. The heat transfer system of claim 1, further comprising a liquid pump in fluid communication with the liquid line, the liquid pump pumping liquid through at least one of the refrigerant desuperheater heat exchanger, the refrigerant condenser heat exchanger and the refrigerant sub-cooler heat exchanger.

8. The heat transfer system of claim 1, further comprising a vapor compressor device in fluid communication with the refrigerant line, wherein the refrigerant enters the vapor compressor device as a cool gas and is heated to a superheated gas.

9. The heat transfer system of claim 1, further comprising:
a liquid pump in fluid communication with the liquid line;
a vapor compressor device in fluid communication with the refrigerant line, wherein the refrigerant enters the vapor compressor device as a cool gas and is heated to a superheated gas; and
a controller in communication with the liquid pump and the vapor compressor device to control the liquid pump and vapor compressor device responsive to demand.

10. The heat transfer system of claim 1, further comprising:
a liquid pump in fluid communication with the liquid line;
a vapor compressor device in fluid communication with the refrigerant line, wherein the refrigerant enters the vapor compressor device as a cool gas and is heated to a superheated gas;
a temperature sensor measuring the temperature of the liquid line; and
a controller in communication with the temperature sensor, the liquid pump and the vapor compressor device to control the liquid pump and vapor compressor device responsive to demand.

11. The heat transfer system of claim 1, further comprising a housing carrying the refrigerant desuperheater heat exchanger, the refrigerant condenser heat exchanger, and the refrigerant sub-cooler heat exchanger.

12. The heat transfer system of claim 1, further comprising a heat source line having a heat source fluid therein and further comprising a refrigerant evaporator heat exchanger in fluid communication with the heat source line and the refrigerant line, the refrigerant evaporator heat exchanger being configured to extract heat from the heat source fluid in the heat source line and being configured to warm the refrigerant in the refrigerant line, wherein the refrigerant evaporator heat exchanger is a sleeved microchannel heat exchanger having a microchannel unit received in an outer sleeve and in thermal communication therewith, the refrigerant passing through the microchannel unit and in thermal communication therewith and the heat source fluid in the heat source line passing along the outer sleeve and in thermal communication therewith.

13. A heat transfer system comprising:
a refrigerant evaporator heat exchanger configured to be in fluid communication with a heat source line and a refrigerant line, wherein the refrigerant evaporator heat exchanger is configured to extract heat from fluid in the heat source line and warm the refrigerant in the refrigerant line;
a refrigerant desuperheater heat exchanger configured to be in fluid communication with the refrigerant line and a water line, wherein the refrigerant desuperheater heat exchanger is configured to extract heat from the refrigerant in the refrigerant line and warm fluid in the water line;
a refrigerant condenser heat exchanger configured to be in fluid communication with the refrigerant line and the water line, wherein the refrigerant condenser heat exchanger is configured to extract heat from the refrigerant in the refrigerant line and warm fluid in the water line; and
a refrigerant sub-cooler heat exchanger configured to be in fluid communication with the refrigerant line and the water line, wherein the refrigerant sub-cooler heat exchanger is configured to extract heat from the refrigerant in the refrigerant line and warm fluid in the water line;
wherein the refrigerant evaporator heat exchanger, the refrigerant desuperheater heat exchanger, the refrigerant condenser heat exchanger, and the refrigerant sub-cooler heat exchanger are sleeved microchannel heat exchangers each having a microchannel unit received in an outer sleeve and in thermal communication therewith, the refrigerant passing through the microchannel unit and in thermal communication therewith and the water or fluid in the heat source line passing along an exterior of the sleeve and in thermal communication therewith, the microchannel unit having a solid body defining a plurality of microchannels therein, the body having walls entirely surrounding each micro channel such that the refrigerant in the microchannels is contained in the microchannels and isolated from the outer sleeve.

14. The heat transfer system of claim 13, wherein the outer sleeve has an interior surface defining a cavity and an exterior surface, the exterior surface being configured to be in direct thermal communication with the corresponding fluid, and wherein the microchannel unit is received in the cavity, the microchannels configured to receive the refrigerant therein and be in direct thermal communication with the refrigerant, the microchannel unit has an exterior surface in direct thermal communication with the interior surface of the outer sleeve to transfer heat between the exterior surface and the interior surface, at least one of the interior surface of the outer sleeve and the exterior surface of the microchannel unit have grooves defining breach channels for the corresponding fluid or refrigerant should a breach in the outer sleeve or the microchannel unit occur.

15. The heat transfer system of claim 14, wherein the outer sleeve and microchannel unit define a heat transfer device, each heat exchanger further comprising a housing holding a plurality of the heat transfer devices, the housing having an inlet and outlet for the corresponding fluid, the housing having an inlet and outlet for the refrigerant.

16. The heat transfer system of claim 15, wherein the housing has a breach chamber in fluid communication with the breach channels of a plurality of the heat transfer devices, the breach chamber collecting the fluid or the refrigerant should a breach in the outer sleeve or the microchannel unit occur.

17. The heat transfer system of claim 13, further comprising a water pump in fluid communication with the water line, the water pump pumping water through at least one of the refrigerant desuperheater heat exchanger, the refrigerant condenser heat exchanger and the refrigerant sub-cooler heat exchanger.

18. The heat transfer system of claim 13, further comprising:
a water pump in fluid communication with the water line;
a vapor compressor device in fluid communication with the refrigerant line, wherein the refrigerant enters the vapor compressor device as a cool gas and is heated to a superheated gas; and
a controller in communication with the water pump and the vapor compressor device to control the water pump and vapor compressor device responsive to demand.

19. The heat transfer system of claim 13, further comprising a housing carrying the refrigerant evaporator heat exchanger, the refrigerant desuperheater heat exchanger, the refrigerant condenser heat exchanger, and the refrigerant sub-cooler heat exchanger.

20. The heat transfer system of claim 13, further comprising a second heat source line in fluid communication with a different heat source than the other heat source line and further comprising a second refrigerant evaporator heat exchanger in fluid communication with the second heat source line and the refrigerant line, the second refrigerant evaporator heat exchanger being configured to extract heat from heat source fluid in the second heat source line and being configured to warm the refrigerant in the refrigerant line, wherein the second refrigerant evaporator heat exchanger is a sleeved microchannel heat exchanger having a microchannel unit received in an outer sleeve and in thermal communication therewith, the refrigerant passing through the microchannel unit and in thermal communication therewith and the heat source fluid in the second heat source line passing along the outer sleeve and in thermal communication therewith.

21. A heat transfer system comprising:
a refrigerant condenser heat exchanger configured to be in fluid communication with a water line and a refrigerant line, the refrigerant condenser heat exchanger configured to extract heat from refrigerant in the refrigerant line and warm fluid in the water line; and
a refrigerant evaporator heat exchanger configured to be in fluid communication with a heat source line and the refrigerant line, the refrigerant evaporator heat exchanger configured to extract heat from fluid in the heat source line and warm the refrigerant in the refrigerant line;
wherein the refrigerant condenser heat exchanger, and the refrigerant evaporator heat exchanger are sleeved microchannel heat exchangers each having a microchannel unit received in an outer sleeve and in thermal communication therewith, the refrigerant passing through the microchannel unit and in thermal communication therewith and the fluid from the water line or the heat source line passing along an exterior of the sleeve and in thermal communication therewith, the microchannel unit having a solid body defining a plurality of microchannels therein, the body having walls entirely surrounding each microchannel such that the refrigerant in the microchannels is contained in the microchannels and isolated from the outer sleeve.

22. The heat transfer system of claim 21, wherein the outer sleeve has an interior surface defining a cavity and an exterior surface, the exterior surface being configured to be in direct thermal communication with the corresponding fluid, and wherein the microchannel unit is received in the cavity, the microchannels configured to receive the refrigerant therein and be in direct thermal communication with the refrigerant, the microchannel unit has an exterior surface in direct thermal communication with the interior surface of the outer sleeve to transfer heat between the exterior surface and the interior surface, at least one of the interior surface of the outer sleeve and the exterior surface of the microchannel unit have grooves defining breach channels for the corresponding fluid or refrigerant should a breach in the outer sleeve or the microchannel unit occur.

23. The heat transfer system of claim 22, wherein the outer sleeve and microchannel unit define a heat transfer device, each heat exchanger further comprising a housing holding a plurality of the heat transfer devices, the housing having an inlet and outlet for the corresponding fluid, the housing having an inlet and outlet for the refrigerant.

24. The heat transfer system of claim 23, wherein the housing has a breach chamber in fluid communication with the breach channels of a plurality of the heat transfer devices, the breach chamber collecting the fluid or the refrigerant should a breach in the outer sleeve or the microchannel unit occur.

25. The heat transfer system of claim 21, further comprising a water pump in fluid communication with the water line, the water pump pumping water through the refrigerant condenser heat exchanger.

26. The heat transfer system of claim 21, further comprising:
a water pump in fluid communication with the water line;
a vapor compressor device in fluid communication with the refrigerant line, wherein the refrigerant enters the vapor compressor device as a cool gas and is heated to a superheated gas; and
a controller in communication with the water pump and the vapor compressor device to control the water pump and vapor compressor device responsive to demand.

27. The heat transfer system of claim 21, further comprising:
a refrigerant desuperheater heat exchanger in fluid communication with both the water line and the refrigerant line;
a refrigerant sub-cooler heat exchanger in fluid communication with both the water line and the refrigerant line; and
a housing carrying the refrigerant evaporator heat exchanger, the refrigerant desuperheater heat exchanger, the refrigerant condenser heat exchanger, and the refrigerant sub-cooler heat exchanger.

28. The heat transfer system of claim 21, further comprising a second heat source line in fluid communication with a different heat source than the other heat source line and further comprising a second refrigerant evaporator heat exchanger in fluid communication with the second heat source line and the refrigerant line, the second refrigerant evaporator heat exchanger being configured to extract heat from heat source fluid in the second heat source line and being configured to warm the refrigerant in the refrigerant line, wherein the second refrigerant evaporator heat exchanger is a sleeved microchannel heat exchanger having a microchannel unit received in an outer sleeve and in thermal communication therewith, the refrigerant passing through the microchannel unit and in thermal communication therewith and the heat source fluid in the second heat source line passing along the outer sleeve and in thermal communication therewith.

29. The heat transfer system of claim 21, further comprising a chiller heat exchanger in thermal communication with hot gas of an auxiliary chiller.

30. A heat transfer system comprising:
a heat exchanger configured to transfer heat between a first fluid and a second fluid, the heat exchanger comprising:
an outer sleeve having an interior surface defining a cavity and an exterior surface, the exterior surface being configured to be in direct thermal communication with the first fluid; and
a microchannel unit received in the cavity, the microchannel unit having a solid body defining a plurality of microchannels configured to receive the second fluid therein and be in direct thermal communication with the second fluid, the body entirely surrounding the microchannels such that the refrigerant in the microchannels is contained in the microchannels and isolated from the outer sleeve, the microchannel unit having an exterior surface in direct thermal communication with the interior surface of the outer sleeve to transfer heat between the exterior surface and the interior surface;
wherein at least one of the interior surface of the outer sleeve and the exterior surface of the microchannel unit have grooves defining breach channels for the first fluid or the second fluid should a breach in the outer sleeve or the microchannel unit occur.

31. The heat transfer system of claim 30, wherein the exterior surface of the outer sleeve has enhancements to increase a surface area of the exterior surface for greater thermal transfer between the outer sleeve and the first fluid.

32. The heat transfer system of claim 30, wherein the exterior surface has interstices extending into a flow path of the first fluid.

33. The heat transfer system of claim 30, wherein the microchannels have enhancements to increase the surface area of the microchannels for greater thermal transfer between the microchannel unit and the second fluid.

34. The heat transfer system of claim 30, wherein the microchannels have interstices extending into a flow path of the second fluid.

35. The heat transfer system of claim 30, wherein the first fluid is potable water and the second fluid is a refrigerant, both the sleeve and the body of the microchannel unit defining a double layer structure being positioned between the first fluid and the second fluid.

36. The heat transfer system of claim 30, wherein the outer sleeve and microchannel unit define a heat transfer device, the heat exchanger further comprising a housing holding a plurality of the heat transfer devices, the housing having an inlet and outlet for the first fluid, the housing having an inlet and outlet for the second fluid.

37. The heat transfer system of claim 36, wherein the housing has a breach chamber in fluid communication with the breach channels of a plurality of the heat transfer devices, the breach chamber collecting the first fluid or the second fluid should a breach in the outer sleeve or the microchannel unit occur.

38. The heat transfer system of claim 37, wherein the housing comprises a cap and a receptacle coupled to the cap, the heat transfer devices being supported by the cap and received in the receptacle, the receptacle being removable from the cap and from the heat transfer devices to expose the heat transfer devices.

39. The heat transfer system of claim 36, wherein the housing includes baffles between the heat transfer devices.

40. The heat transfer system of claim 30, wherein the microchannel unit and the outer sleeve extend longitudinally between ends, the grooves extend between corresponding ends and are in fluid communication with a breach manifold at at least one of the ends.

* * * * *